United States Patent
Zhang et al.

(10) Patent No.: US 8,576,831 B2
(45) Date of Patent: Nov. 5, 2013

(54) WIRELESS NETWORK SYSTEM CARRYING OUT MULTIHOP WIRELESS COMMUNICATION BETWEEN SOURCE AND DESTINATION

(75) Inventors: Bing Zhang, Koganei (JP); Seiji Igi, Koganei (JP); Youiti Kado, Tokyo (JP)

(73) Assignees: National Institute of Information and Communications Technology, Koganei-shi, Tokyo (JP); Oki Electric Industry Co., Ltd., Minato-ku, Tokyo (JP)

( * ) Notice: Subject to any disclaimer, the term of this patent is extended or adjusted under 35 U.S.C. 154(b) by 1197 days.

(21) Appl. No.: 12/096,285

(22) PCT Filed: Dec. 6, 2005

(86) PCT No.: PCT/JP2005/022385
§ 371 (c)(1),
(2), (4) Date: Jun. 5, 2008

(87) PCT Pub. No.: WO2007/066386
PCT Pub. Date: Jun. 14, 2007

(65) Prior Publication Data
US 2009/0274128 A1    Nov. 5, 2009

(51) Int. Cl.
*H04L 12/28* (2006.01)
*H04L 12/56* (2011.01)

(52) U.S. Cl.
USPC .......................... 370/351; 370/400; 370/401

(58) Field of Classification Search
USPC ........... 370/351, 400, 401; 709/220, 238, 239
See application file for complete search history.

(56) References Cited

U.S. PATENT DOCUMENTS

| 6,574,663 B1* | 6/2003 | Bakshi et al. ................. 709/223 |
| 6,816,460 B1 | 11/2004 | Ahmed et al. |
| 7,327,683 B2* | 2/2008 | Ogier et al. ................... 370/236 |

(Continued)

FOREIGN PATENT DOCUMENTS

| JP | 2001-268127 A | 9/2001 |
| JP | 2002-335277 A | 11/2002 |

(Continued)

OTHER PUBLICATIONS

Masatake MIYABEet al; "A Study of the GMPLS control architecture for IP photonic network," IEICE Technical Report (NS2001-180); vol. 101; No. 508; Dec. 10, 2001; pp. 61-66.

(Continued)

*Primary Examiner* — Brandon Renner
*Assistant Examiner* — Scott M Sciacca
(74) *Attorney, Agent, or Firm* — Westerman, Hattori, Daniels & Adrian, LLP

(57) ABSTRACT

A radio device, which is the source, transmits a route request packet (RREQ) to a radio device. In response to the route request packet (RREQ), the radio device transmits to the radio device a route setup packet (RSET) including a route Radio Device Radio Device Radio Device Radio Device by looking-up topology information (TPIF). In response to the route setup packet (RSET), the radio device produces a route notification packet (RNTF) and transmits the produced route notification packet (RNTF) to radio devices, and. In response to the route notification packet (RNTF), the radio device, which is the destination, produces a route reply packet (RREP) and transmits the produced route reply packet (RREP) to the radio device, which is the source.

4 Claims, 14 Drawing Sheets

(56) References Cited

U.S. PATENT DOCUMENTS

| | | | |
|---|---|---|---|
| 2005/0105475 A1* | 5/2005 | Norrgard et al. | 370/254 |
| 2005/0154790 A1* | 7/2005 | Nagata et al. | 709/223 |
| 2008/0205355 A1* | 8/2008 | Liu et al. | 370/338 |

FOREIGN PATENT DOCUMENTS

| | | | | |
|---|---|---|---|---|
| JP | 2003-318969 A | | 11/2003 | |
| JP | 2004-260465 A | | 9/2004 | |
| JP | 2004260465 A | * | 9/2004 | H04B 7/26 |

OTHER PUBLICATIONS

Rohit Dube et al; "Signal Stability-Based Adaptive Routing (SSA) for Ad Hoc Mobile Networks," IEEE Personal Communications; Feb. 1997; pp. 36-45.

Guangyu Pei et al; "Fisheye State Routing: A Routing Scheme for Ad Hoc Wireless Networks," ICC2000 Communication; vol. 1; L.A; Jun. 2000; pp. 70-74.

International Search Report of PCT/JP2005/022385, date of mailing Jan. 17, 2006.

Japanese Office Action dated Oct. 19, 2010, issued in corresponding Japanese Patent Application No. 2007-548988.

Morita, Kazuki et al.; "RSVMRD: Bandwidth Reservation with Multiple-Route Detection"; Technical Report of Institute of Electronics, Information and Communication Engineers, vol. 103, No. 492, Dec. 11, 2003, and Partial Translation thereof.

Japanese Office Action dated Feb. 8, 2011, issued in corresponding Japanese Patent Application No. 2007-548988.

* cited by examiner

Fig.3

| DESTINATION | NEXT RADIO DEVICE | NUMBER OF HOPS |
|---|---|---|
| ..... | ..... | ..... |
| ..... | ..... | ..... |
| ⋮ | ⋮ | ⋮ |

RREQ

| ID | LENGTH | MODE FLAG | NUMBER OF DESTINATIONS | NUMBER OF HOPS | RREQ -ID | SOURCE ADDRESS | SOURCE SEQUENCE NUMBER | METRIC | DESTINATION ADDRESS #1 | DESTINATION SEQUENCE NUMBER #1 | ... | DESTINATION ADDRESS #N | DESTINATION SEQUENCE NUMBER #N |

Fig.5

RREP

| ID | LENGTH | MODE FLAG | NUMBER OF SOURCES | DESTINATION ADDRESS | DESTINATION SEQUENCE NUMBER | LIFETIME | METRIC | SOURCE ADDRESS #1 | SOURCE SEQUENCE NUMBER #1 | ... | SOURCE ADDRESS #N | SOURCE SEQUENCE NUMBER #N |

Fig.6

RSET

| ID | LENGTH | MODE FLAG | RSET -ID | RREQ -ID | ROOT ADDRESS | ROOT SEQUENCE NUMBER | NUMBER OF RADIO DEVICES | RNTF ADDRESS | RADIO DEVICE ADDRESS #1 | ... | RADIO DEVICE ADDRESS #N |

Fig.7

RNTF

| ID | LENGTH | MODE FLAG | RNTF-ID | RREQ-ID | NUMBER OF RADIO DEVICES | LIFETIME | RNTF ADDRESS | RNTF SEQUENCE NUMBER | RADIO DEVICE ADDRESS #1 | ... | RADIO DEVICE ADDRESS #N |

Fig.8

RAE

| ELEMENT ID | LENGTH | MODE FLAG | MESH PORTAL BRIDGE ID | PRIORITY | NUMBER OF MESH PORTALS | MESH PORTAL ADDRESS | ROOT SEQUENCE NUMBER | ROOT METRIC | TOPOLOGY MAINTENANCE METHOD | CONNECTED MESH PORTAL ID |

Fig.12

| DESTINATION | NEXT RADIO DEVICE | NUMBER OF HOPS |
|---|---|---|
| 5 | 4 | 3 |

RADIO DEVICE 1    20B

| DESTINATION | NEXT RADIO DEVICE | NUMBER OF HOPS |
|---|---|---|
| 0 | 0 | 1 |
| 2 | 2 | 1 |
| 3 | 3 | 1 |
| 4 | 4 | 1 |
| 5 | 2 | 2 |
| 6 | 3 | 2 |
| 7 | 4 | 2 |
| 8 | 4 | 3 |
| 9 | 3 | 3 |

Fig.13B

RADIO DEVICE 3    20C

| DESTINATION | NEXT RADIO DEVICE | NUMBER OF HOPS |
|---|---|---|
| 0 | 1 | 2 |
| 1 | 1 | 1 |
| 2 | 4 | 2 |
| 4 | 4 | 1 |
| 5 | 4 | 3 |
| 6 | 6 | 1 |
| 7 | 6 | 2 |
| 8 | 6 | 3 |
| 9 | 6 | 2 |

Fig.13C

RADIO DEVICE 4    20D

| DESTINATION | NEXT RADIO DEVICE | NUMBER OF HOPS |
|---|---|---|
| 0 | 1 | 2 |
| 1 | 1 | 1 |
| 2 | 2 | 1 |
| 3 | 3 | 1 |
| 5 | 7 | 2 |
| 6 | 6 | 1 |
| 7 | 7 | 1 |
| 8 | 7 | 2 |
| 9 | 7 | 2 |

Fig.13D

RADIO DEVICE 7    20E

| DESTINATION | NEXT RADIO DEVICE | NUMBER OF HOPS |
|---|---|---|
| 0 | 5 | 3 |
| 1 | 4 | 2 |
| 2 | 4 | 2 |
| 3 | 6 | 2 |
| 4 | 4 | 1 |
| 5 | 5 | 1 |
| 6 | 6 | 1 |
| 8 | 8 | 1 |
| 9 | 9 | 1 |

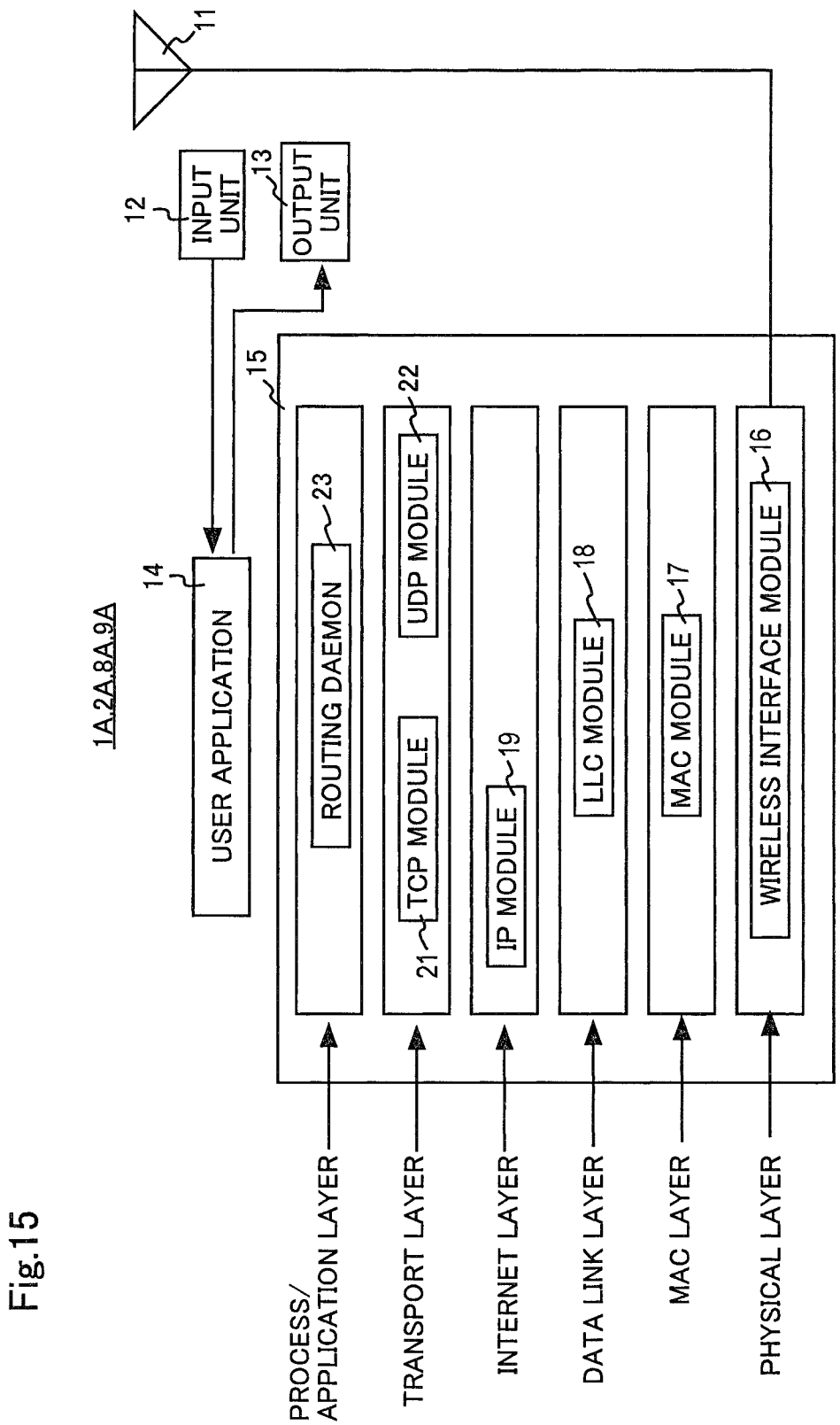

WIRELESS NETWORK SYSTEM CARRYING OUT MULTIHOP WIRELESS COMMUNICATION BETWEEN SOURCE AND DESTINATION

TECHNICAL FIELD

The present invention relates to wireless network systems. It particularly relates to wireless network systems that enable load reduction.

BACKGROUND ART

Ad hoc networks are constructed autonomously and instantly in response to communications between a plurality of radio devices. In ad hoc networks, when two interacting radio devices are not located in the same communication area, a radio device that is located between the two radio devices functions as a router and relays data packets. In this way, large multi-hop networks are formed.

Dynamic routing protocols that support multi-hop communications are classified into two categories: table-driven protocols and on-demand protocols. Table-driven protocols periodically exchange route control information and preestablish the routing table. Known table-driven protocols include FSR (Fish-eye State Routing), OLSR (Optimized Link State Routing) and TBRPF (Topology Dissemination Based on Reverse-Path Forwarding).

On-demand protocols establish routes to the destination only when data transmission is required. Known on-demand protocols include DSR (Dynamic Source Routing) and AODV (Ad Hoc On-Demand Distance Vector Routing).

In conventional ad hoc networks, when data is transmitted from source to destination, the communication route is determined so that the number of hops from source to destination is as small as possible (Guangyu Pei, et al., "Fisheye state routing: a routing scheme for ad hoc wireless networks," ICC2000. Commun., Volume 1, L.A., June 2000, pp. 70-74.)

However, as the wireless environment is unstable, the route with small hop numbers does not necessarily guarantee the quality. Therefore, it is better to select only stable routes in some way. Known major methods thereof are methods of introducing signal strength thresholds and methods of measuring packet loss rates.

The methods of measuring packet loss rates work effectively when packet loss is happening continuously.

The methods of introducing signal strength thresholds include a known method of extracting stable routes based on the average signal strength.

Non-patent Document 1: Rohit Dube, Cynthia D. Rais, Kuang-Yeh Wang, and Satish K. Tripathi, "Signal Stability-based Adaptive Routing (SSA) for Ad Hoc Mobile Networks," IEEE Personal Communications, February 1997, pp. 36-45.)

Disclosure of the Invention

Unfortunately, in wireless network systems where radio devices carry out, according to a table-driven routing protocol, wireless communications based on link state information of neighboring radio devices, it is problematic that loads to the wireless network systems is heavy. This is because, in such wireless network systems, a plurality of radio devices each periodically communicates link state information with other radio devices, produces a topology table presenting the arrangement of the radio devices in the wireless network systems based on the link state information received from other radio devices, and monitors the produced topology table. This results in heavy load to all the plurality of radio devices in the network systems.

The present invention is aimed at solving the afore-mentioned problem. One of its objects is to provide a wireless network system that enables load reduction.

According to the present invention, a wireless network system carrying out multi-hop wireless communication between source and destination comprises a first radio device and a plurality of second radio devices. The first radio device maintains topology information indicating the arrangement of all the radio devices constituting the wireless network system and, when the route for wireless communication is established between source and destination, transmits route information indicating the route based on the topology information. The plurality of second radio devices establish the route based on the route information transmitted by the first radio device.

Preferably, each of the first radio device and the plurality of second radio devices is suitable to wireless communication based on link state information related to their respective adjacent radio devices.

Preferably, upon carrying out wireless communication with the destination, the source radio device that is one the plurality of second radio devices receives, from the first radio device, route information indicating the route from the source radio device itself to the destination radio device and establishes the route to the destination radio device based on the received route information.

Preferably, the source radio device transmits a route request packet to the first radio device, receives from the first radio device a route setup packet including route information, transmits a route notification packet notifying each radio device on the route that the wireless communication is carried out along the route indicated by the route information included in the received route setup packet, and receives from the destination radio device a route reply packet accepting the establishment of the route indicated by the route information. In response to the route request packet, the first radio device extracts the route information indicating the optimal route from the source radio device to the destination radio device by looking-up the topology information, produces the route setup packet including the extracted route information and transmits the produced route setup packet to the source radio device. Upon receiving the route notification packet, the destination radio device produces the route reply packet and transmits the produced route reply packet to the source radio device.

Preferably, the source radio device transmits a route request packet to the first radio device, receives from the first radio device a route setup packet including the route information, transmits a route notification packet notifying each radio device on the route that wireless communication is carried out along the route indicated by the route information included in the received route setup packet, and receives from the destination radio device a route reply packet accepting the establishment of the route indicated by the route information. In response to the route request packet, the he first radio device extracts route information indicating the optimal route from the source radio device to the destination radio device by looking-up the topology information, produces the route setup packet including the extracted route information and transmits the produced route setup packet to the source radio device. Upon receiving the route notification packet, an adjacent radio device adjacent, on the route, to the destination radio device transmits the route request packet to the destination radio device. In response to the route request packet, the destination radio device produces the route reply packet and transmits the produced route reply packet to the source radio device.

Preferably, based on the topology information, the first radio device produced a routing table including route information indicating the routes for which the destination is each radio device in the wireless network system and transmits the produced routing table to the plurality of second radio devices. Each of the plurality of second radio devices receives the routing table from the first radio device and, based on the received routing table, establishes the route to the destination radio device.

Preferably, the first radio device is suitable to wireless communication based on link state information related to a radio device adjacent to the first radio device itself. The plurality of second radio devices comprise i (i is a positive integer) third radio devices each suitable to wireless communication based on the link state information and j (j is a positive integer) fourth radio devices each unsuitable to wireless communication base on the link state information.

Preferably, a radio device adjacent to one of the j fourth radio device is one of the i third radio devices.

Preferably, when the source radio device that is one of the j fourth radio devices carries out wireless communication with the destination, a first adjacent radio device that is adjacent to the source radio device and is one of the i third radio devices receives, from the first radio device, route information indicating the route from the source radio device to the destination radio device and establishes the route to the destination radio device based on the received route information.

Preferably, the source radio device transmits a route request packet to the first radio device. The first adjacent radio device receives from the first radio device a route setup packet including route information, transmits a route notification packet notifying each radio device on the route that wireless communication is carried out along the route indicated by the route information included in the received route setup packet, receives from the destination radio device a route reply packet accepting the establishment of the route indicated by the route information, and relays the received route reply packet to the source radio device. In response to the route request packet, the first radio device extracts route information indicating the optimal route from the source radio device to the destination radio device by looking-up the topology information, produces the route setup packet including the extracted route information and transmits the produced route setup packet to the first adjacent radio device. Upon receiving the route notification packet, the destination radio device produces the route reply packet and transmits the produced route reply packet to the source radio device.

Preferably, when the destination radio device is one of the j fourth radio device, upon receiving the route notification packet, a second adjacent radio device that is adjacent, on the route, to the destination radio device and is one of the i third radio devices transmits a route request packet to the destination radio device.

Preferably, based on the topology information, the first radio device produces a routing table including route information indicating the route for which the destination is each radio device in the wireless network system and transmits the produced routing table to the i third radio devices. Each of the i third radio devices receives the routing table from the first radio device and, base on the received routing table, establishes the route to the destination radio device.

In the wireless network system according to the present invention, one radio device (the first radio device) produces and maintains topology information indicating the arrangement of all radio devices constituting the wireless network system. None of the plurality of second radio devices produce nor maintain the topology information.

Therefore, according to the present invention, the load to the plurality of second radio devices is reduced. As a result, compared to the case where all of the first radio device and the plurality of second radio devices produce and maintain the topology information, the load to the wireless network system is reduced.

BRIEF DESCRIPTION OF THE DRAWINGS

FIG. 3 illustrates the structure of the routing table shown in FIG. 2.

FIG. 4 illustrates the format of the route request packet.

FIG. 5 illustrates the format of the route reply packet.

FIG. 6 illustrates the format of the route setup packet.

FIG. 7 illustrates the format of the route notification packet.

FIG. 8 illustrated the format of the route announcement packet.

FIG. 12 shows another example of the routing table.

FIG. 13A illustrates another example of the routing table.

FIG. 13B illustrates another example of the routing table.

FIG. 13C illustrates another example of the routing table.

FIG. 13D illustrates another example of the routing table.

FIG. 15 is a schematic block diagram illustrating the structure of some radio devices of the radio devices shown in FIG. 14.

BEST MODES FOR CARRYING OUT THE INVENTION

The present invention will now be described in embodiments with reference to the drawings more specifically. In the figures, identical or like components are identically denoted by the same reference numbers and explanations thereof are not repeated.

[Embodiment 1]

Figure 1:
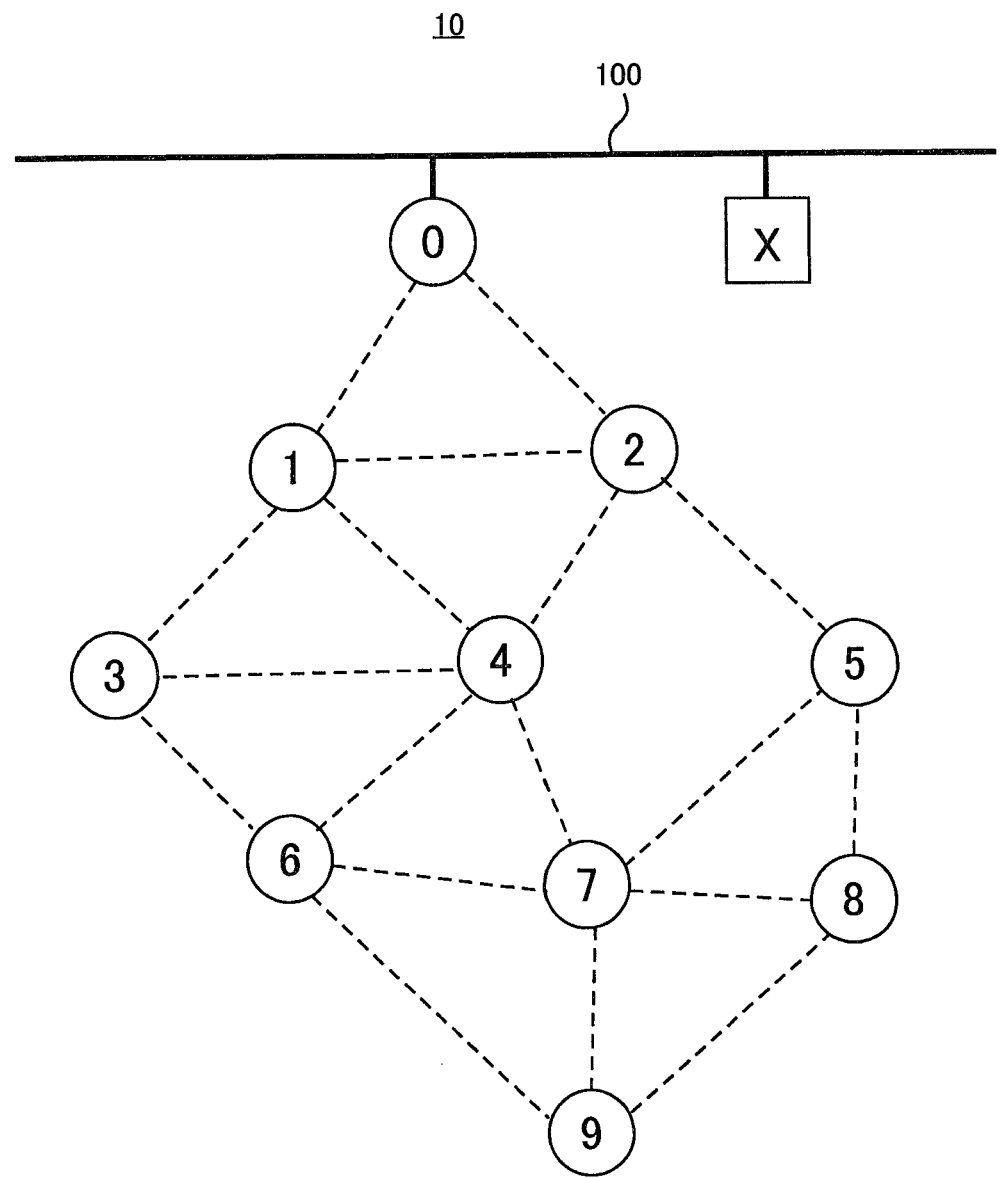
FIG. 1 is a schematic diagram of a wireless network system according to Embodiment 1 of the present invention.

FIG. 1 is a schematic diagram of a wireless network system according to Embodiment 1 of the present invention. With reference to FIG. 1, the wireless network system 10 according to Embodiment 1 of the present invention comprises radio devices 0 to 9. The radio devices 0 to 9 are located in a wireless communication space and constitute a mesh network. The radio device 0 comprises a gateway and is connected to a cable 100. Note that a radio device x constitutes another wireless network system and is a gateway connected to the cable 100.

For example, when data is transmitted from the radio device 3 to the radio device 5, the radio devices 4 and 7 relay packets received from the radio device 3 to the radio device 5. Likewise, in the wireless network system 10, a plurality of radio devices relays packets from the source and, in this way, the packets are sent from source to destination. More specifically, in the wireless network system 10, multi-hop wireless communications are carried out between source and destination.

Each of the radio devices 0 to 9 comprises a radio device suitable to wireless communication based on link state information, which is related to radio devices adjacent to the radio devices 0 to 9 themselves. Each of the radio devices 0 to 9 has both functions of a table-driven routing protocol and an on-demand routing protocol.

Note that, here, the OLSR protocol is used as the table-driven routing protocol, and the AODV protocol is used as the on-demand routing protocol.

Figure 2:
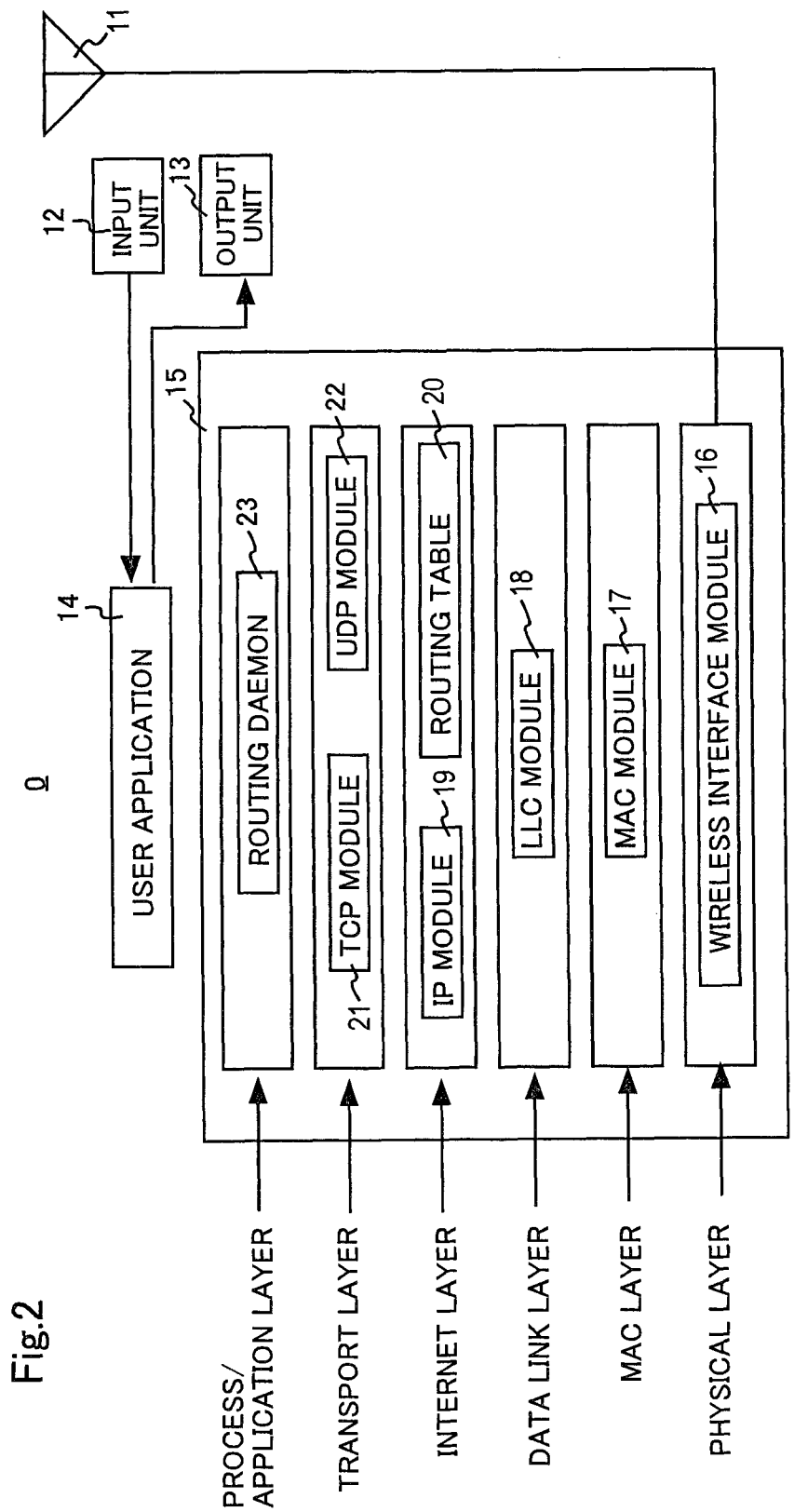
FIG. 2 is a schematic block diagram illustrating the structure of the lo radio device shown in FIG. 1.

FIG. 2 is a schematic block diagram illustrating the structure of the radio device 0 shown in FIG. 1. The radio device 0 includes an antenna 11, an input unit 12, an output unit 13, a user application 14, and a communication control unit 15.

The antenna 11 receives data from other radio devices over a wireless communication space, outputs the received data to the communication control unit 15 and transmits data received from the communication control unit 15 to other radio devices over the wireless communication space.

The input unit 12 receives a message and a destination of data that have been input by a user of the radio device 0 and outputs the received message and destination to the user application 14. The output unit 13 displays the message in accordance with control by the user application 14.

The user application 14 produces data based on the message and address received form the input unit 12 and outputs the produced data to the communication control unit 15.

The communication control unit 15 comprises a plurality of modules that controls communications according to the ARPA (Advanced Research Projects Agency) internet hierarchical structure. More specifically, the communication control unit 15 comprises a wireless interface module 16, a MAC (Media Access Control) module 17, an LLC (Logical Link Control) module 18, an IP (Internet Protocol) module 19, a routing table 20, a TCP module 21, a UDP module 22, and a routing daemon 23.

Belonging to the physical layer, the wireless interface module 16 modulates/demodulates transmitting signals or receiving signals in accordance with a prescribed regulation and transmits/receives signals through the antenna 11.

The MAC module 17 belongs to the MAC layer and executes various functions described below by executing the MAC protocol.

More specifically, the MAC module 17 receives a Hello packet from the routing daemon 23 and broadcasts the Hello packet through the wireless interface module 16.

The MAC module 17 performs data (packet) retransmission control, or the like.

The LLC module 19, which belongs to the data link layer, executes the LLC protocol and connects/disconnects links with adjacent radio devices.

The IP module 19 belongs to the Internet layer and produces an IP packet. The IP packet includes an IP header and an IP data unit to store packets sent by the upper protocols. Upon receiving data from the TCP module 21, the IP module 19 produces the IP packet by storing the received data into the IP data unit.

Then, the IP module 19 searches among the routing table 20 in accordance with the OLSR protocol and selects a route to transmit the produced IP packet. The IP module 19 then transmits the IP packet to the LLC module 18 in order to transmit the IP packet to the destination along the selected route.

The routing table 20 belongs to the Internet layer and, as described below, stores route information by matching the respective destinations thereto.

The TCP module 21 belongs to the transport layer and produces a TCP packet, which includes a TCP header and a TCP data unit to store data sent by the upper protocols. The TCP module 21 then transmits the produced TCP packet to the IP module 19.

The UDP module 22, which belongs to the transport layer, broadcasts an Update packet produced by the routing daemon 23. The UDP module 22 also receives Update packets broadcast by other radio devices and outputs the received Update packets to the routing daemon 23.

The routing daemon 23, which belongs to the process/application layer, monitors the execution status of other communication control modules and processes requests from other communication control modules.

The routing daemon 23 also periodically transmits requests for obtaining link state information to other radio devices and receives link state information from other radio devices. Then, with the methods described below, the routing daemon 23 produces a topology table that indicates the arrangement of all the radio devices 0 to 9 in the wireless network system 10 based on the link state information received from other radio devices (the radio devices 1 to 9) and maintains the produced topology table.

Further, upon receiving a route request packet RREQ from other radio devices, the routing daemon 23 detects, based on the topology table, route information presenting the optimal route for wireless communication between other radio devices and their respective destinations. The routing daemon 23 then produces a route setup packet RSET including the detected route information.

It should be noted that each of the radio devices 1 to 9 shown in FIG. 1 has the same structure as the radio device 0 shown in FIG. 2. None of the radio devices 1 to 9, however, has the functions to produce a topology table and to maintain the produced topology table. Accordingly, with the present invention, only the radio device 0 produces and maintains the topology table FIG. 3 illustrates the structure of the routing table 20 shown in FIG. 2. With reference to FIG. 3, the routing table 20 includes Destination, Next Radio Device and Number of Hops, which are associated with each other.

The Destination represents the IP address of the destination radio device. The Next Radio Device is the IP address of the radio device to which packets must be transmitted next toward the destination. The Number of Hops represents the number of hops to the destination. For example, with reference to FIG. 1, when wireless communication is carried out between the radio device 3 and the radio device 5 along route Radio Device 3-Radio Device 4-Radio Device 7-Radio Device 5, a value 3 is stored into the Number of Hops in the routing table 20 of the radio device 3.

FIG. 4 illustrates the format of the route request packet RREQ. With reference to FIG. 4, the route request packet RREQ includes ID, Length, Mode Flag, Number of Destinations, Number of Hops, RREQ-ID, Source Address, Source Sequence Number, Metric, Destination Address #1, Destination Sequence Number #1, . . . , Destination Address #N, and Destination Sequence Number #N.

Each of the ID, Length, Mode Flag, Number of Destinations, and Number of Hops has a data length of 1 octet. The RREQ-ID has a data length of 4 octets. The Source Address has a data length of 6 octets. Each of the Source Sequence Number and Metric has a data length of 4 octets. Each of the Destination Address #1 to Destination Address #N has a data length of 6 octets. Each of the Destination Sequence Number #1 to Destination Sequence Number #N has a data length of 4 octets.

The ID comprises an identifier that identifies the route request packet RREQ. The Length represents the length of the route request packet RREQ and is a variable value. The Mode Flag is any of Bit 0, Bit 1, and Bit 2 to 7. The Bit 0 represents the request mode. The Bit 1 represents the broadcast mode. The Bit 2 to 7 is reserved.

The Number of Destinations is the number of combinations of the destination addresses and the destination sequence numbers. The Number of Hops is the number of hops from the source MAC address to the radio devices relaying the route request packet. Therefore, the Number of Hops is incremented by 1 for each relay of the route request packet RREQ.

The RREQ-ID is associated with the MAC address of the radio device that has produced the route request packet RREQ and is an eigenvalue to indentify the route request packet RREQ. Therefore, the RREQ-ID is never changed.

The Source Address includes the MAC address of the source radio device. The Source Sequence Number includes a series of sequence numbers used to enter the route implying the source of the route request packet RREQ.

The Metric includes the cumulative metric from the source radio device to the radio devices relaying the route request packet RREQ. Therefore, the Metric is incremented for each relay of the route request packet RREQ.

Each of the Destination Address #1 to Destination Address #N includes the MAC address of the destination of the requested route.

Each of the Destination Sequence Number #1 to Destination Sequence Number #N includes the latest sequence number of sequence numbers received in the past by the source of the route toward the destination radio device. It should be noted that when each of the Destination Sequence Number #1 to Destination Sequence Number #N stores 0, each of the Destination Sequence Number #1 to Destination Sequence Number #N indicates that the source does not know the sequence number of the destination.

FIG. 5 illustrates the format of a route reply packet RREP. With reference to FIG. 5, the route reply packet RREP comprises ID, Length, Mode Flag, Number of Sources, Destination Address, Destination Sequence Number, Lifetime, Metric, Source Address #1, Source Sequence Number #1, . . . , Source Address #N, and Source Sequence Number #N.

Each of the ID, Length, Mode Flag, and Number of Sources has a data length of 1 octet. The Destination Address has a data length of 6 octets. Each of the Destination Sequence Number, Lifetime and Metric has a data length of 4 octets. Each of the Source Address #1 to Source Address #N has a data length of 6 octets. Each of the Source Sequence Number #1 to Source Sequence Number #N has a data length of 4 octets.

The ID includes an identifier that identifies the route reply packet RREP. The Length represents the length of the route reply packet RREP and is a variable value. The Mode Flag is any of Bit 0, Bit 1, and Bit 2 to 7. The Bit 0 represents the request mode. The Bit 1 represents the transfer mode. The Bit 2 to 7 is reserved.

The Number of Sources is the number of combinations of the source addresses and source sequence numbers. The Destination Address includes the MAC address of the destination radio device of the requested route. The Destination Sequence Number includes the latest sequence number of sequence numbers received in the past by the source of the route toward the destination radio device. It should be noted that when the Destination Address stores 0, the Destination Address indicates that the source does not know the sequence number of the destination.

The Lifetime is the time it takes for the radio device receiving the route reply packet RREP to determine whether the route is valid or not and is on the millisecond time scale. The Metric is the cumulative Metric from the destination radio device to the radio device relaying the route reply packet RREP. Therefore, the Metric is incremented for each relay of the route reply packet RREP.

Each of the Source Address #1 to Source Address #N includes the MAC address of the source of the route request packet RREQ at a time when the route was provided. Each of the Source Sequence Number #1 to Source Sequence Number #N includes a series of sequence numbers that is used to enter the route implying the source of the route request packet RREQ.

FIG. 6 illustrates the format of a route setup packet RSET. With reference to FIG. 6, the route setup packet RSET includes ID, Length, Mode Flag, RSET-ID, RREQ-ID, Root Address, Root Sequence Number, Number of Radio Devices, RNTF Address, and Radio Device Address #1 to Radio Device Address #N.

Each of the ID, Length, Mode Flag, RSET-ID, and RREQ-ID has a data length of 1 octet. The Root Address has a data length of 6 octets. The Root Sequence Number has a data length of 4 octets. The Number of Radio Devices has a data length of 1 octet. Each of the RNTF Address and Radio Device Address #1 to Radio Device Address #N has a data length of 6 octets.

The ID includes an identifier that identifies the route setup packet RSET. The Length represents the length of the route setup packet RSET and is a variable value. The Mode Flag includes any one of Bit 0, Bit 1 and Bit 2 to 7. The Bit 0 represents the unicast mode. The Bit 1 represents the broadcast mode. The Bit 2 to 7 is reserved.

The RSET-ID is associated with the MAC address of the radio device that has produced the route setup packet RSET and includes an eigenvalue to identify the route setup packet RSET. Therefore, the RSET-ID is never changed.

The RREQ-ID includes the RREQ-ID received by the Root radio device. The Root Address includes the MAC address of the Root radio device that searches for a better route.

The Root Sequence Number includes a series of sequence numbers used to enter the route implying the Root radio device.

The Number of Radio Devices is the number of radio devices that exist on the set route. The RNTF Address includes the MAC address of the radio device that starts to send the route notification packet notifying that a route setup is requested.

Each of the Radio Device Address #1 to Radio Device Address #N includes the MAC address of the radio devices that exist on the route for which the setup is requested.

FIG. 7 illustrates the format of the route notification packet RNTF. With reference to FIG. 7, the route notification packet RNTF includes ID, Length, Mode Flag, RNTF-ID, RREQ-ID, Number of Radio Devices, Lifetime, RNTF Address, RNTF Sequence Number, and Radio Device Address #1 to Radio Device Address #N.

Each of the ID, Length, Mode Flag, RNTF-ID, RREQ-ID, and Number of Radio Devices has a data length of 1 octet. The Lifetime has a data length of 4 octets. The RNTF Address has a data length of 6 octets. The RNTF Sequence Number has a data length of 4 octets. Each of the Radio Device Address #1 to Radio Device Address #N has a data length of 6 octets.

The ID includes an identifier that indentifies the route notification packet RNTF. The Length represents the length of the route notification packet RNTF and is a variable value. The Mode Flag includes any one of Bit 0, Bit 1, and Bit 2 to 7. The Bit 0 represents the unicast mode. The Bit 1 represents the broadcast mode. The Bit 2 to 7 is reserved.

The RNTF-ID is associated with the MAC address of the source radio device of the route notification packet RNTF and includes an eigenvalue to identify the route notification packet RNTF. Therefore, the RNTF-ID is never changed.

The RREQ-ID includes the RREQ-ID received by the Root radio device. The Number of Radio Devices is the number of radio devices that exist on the set route. The Lifetime is the time it takes for the radio devices receiving the route notification packet RNTF to determine whether the route is valid or not and is on the millisecond time scale. The RNTF Address includes the MAC address of the radio device that has produced the route notification packet RNTF to notify that a route setup is requested.

The RNTF Sequence Number includes a series of sequence numbers used to enter the route implying the source of the route request packet RREQ. Each of the Radio Device Address #1 to Radio Device Address #N includes the MAC address of the radio devices that exist on the route for which the setup is requested.

FIG. 8 illustrates the format of a route announcement packet RAE. With reference to FIG. 8, the route announcement packet RAE includes Element ID, Length, Flag, Mesh Portal Bridge ID, Priority, Number of Mesh Portals, Mesh Portal Address, Root Sequence Number, Root Metric, Topology Maintenance Method, and Connected Mesh Portal ID.

Each of the Element ID, Length and Flag has a data length of 1 octet. The Mesh Portal Bridge ID has a data length of 6 octets. Each of the Priority and Number of Mesh Portals has a data length of 1 octet. The Mesh Portal Address has a data length of 6 octets. Each of the Root Sequence Number and Root Metric has a data length of 4 octets. The Topology Maintenance Method has a data length of 1 octet. The Connected Mesh Portal ID has a data length of 6×N octets.

The Element ID includes an identifier that identifies the route announcement packet RAE. The Length represents the length of respective information. The Flag includes any one of Bit 0, Bit 1 and Bit 2 to 7. The Bit 0 represents the type of the announcement. The Bit 1 represents the HWMP (Hybrid Wireless Mesh Protocol) registration. The Bit 2 to 7 is reserved.

The Mesh Portal Bridge ID is unique bridge ID of Mesh Portals. As for the Priority, a Mesh Portal that has the lowest priority is to be the default Mesh Portal: a value of 0 means that the Mesh Portal is configured as a Root radio device.

The Number of Mesh Portals is the number of the connected Mesh Portals which have wired and wireless connectivity. The Mesh Portal Address includes the MAC address of Mesh Portals. The Root Sequence Number is the latest sequence number of sequence numbers received in the past by the source of routes towards the Root radio device.

The Metric is the cumulative metric from the Root radio device to the radio device transmitting the route announcement packet RAE. Therefore, the Metric is incremented for each relay of the route announcement packet RAE.

The Topology Maintenance Method includes any one of 0 to 3. The values 0 to 3 represent Methods 1 to 4, respectively. The Connected Mesh Portal ID is the list of MAC addresses of Mesh Portals that have both wired and wireless connectivity: a value of 0 means that the route announcement packet RAE has been transmitted by the Root radio device.

Figure 9:
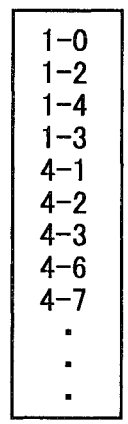
FIG. 9 shows an example of link state information.

FIG. 9 shows an example of link state information LSIF. With reference to FIG. 9, the link state information LSIF includes a radio device adjacent to each of the radio devices 0 to 9 in the wireless network system 10.

For example, the radio device 0, the radio device 2, the radio device 4, and the radio device 3 are each adjacent to the radio device 1. Likewise, the radio device 1, the radio device 2, the radio device 3, the radio device 6, and the radio device 7 are each adjacent to the radio device 4. Therefore, the link state information LSIF includes 1-0, 1-2, 1-4, 1-3, 4-1, 4-2, 4-3, 4-6, and 4-7.

Each of the radio devices 0 to 9, as described above, is suitable to wireless communication based the link state information LSIF. Therefore, each of the radio devices 0 to 9 periodically gathers the information about the radio devices adjacent to the radio devices 0 to 9 themselves. Then, each of the radio devices 0 to 9 produces the link state information LSIF consisting of the gathered information.

Figure 10:
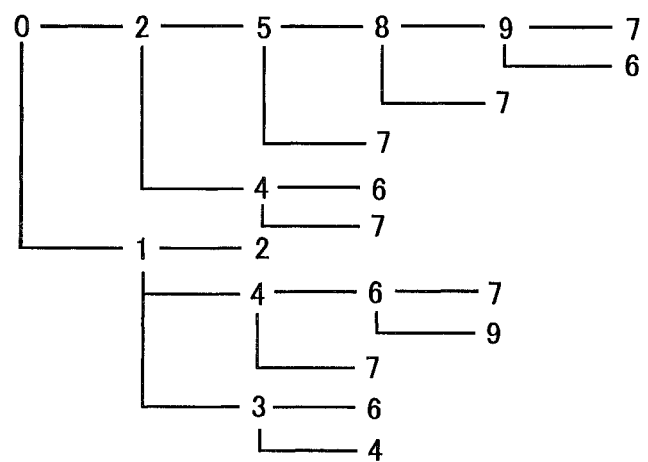
FIG. 10 shows an example of topology information.

FIG. 10 shows an example of topology information TPIF. The radio device 0 periodically receives the link state information LSIF from the radio devices 1 to 9. Then, based on the received link state information LSIF, the radio device 0 produces and maintains the topology information TPIF indicating the arrangement of the radio devices 0 to 9.

In FIG. 10, the topology information TPIF only includes the topology information indicating the arrangement of the radio devices 0 to 9 in which the radio device 0 is origin. In practice, however, the topology information TPIF includes topology information indicating the arrangement of the radio devices 0 to 9 in which each of the radio devices 0 to 9 is origin.

The radio device 0 produces and maintains the topology information TPIF indicating the arrangement of all the radio devices 0 to 9 in the wireless network system 10. In addition, in response to route requests from the radio devices 1 to 9, the radio device 0 also detects route information indicating routes from each of the radio devices 1 to 9 to the destination radio device based on the topology information TPIF. The radio device 0 then functions as the Root radio device that transmits the detected route information to the radio device (any of the radio devices 1 to 9) that has transmitted the route request.

Then, the radio device 0 produces a route announcement packet RAE announcing that the radio device 0 itself functions as the Root radio device and transmits the packet to the radio devices 1 to 9. More specifically, the routing daemon 23 of the radio device 0 produces a route announcement packet RAE whose the Priority is set to 0 and the Flag is set to 0, and transmits the packet to the radio devices 1 to 9. Therefore, the radio devices 1 to 9 recognize that the radio device 0 functions as the Root radio device.

Each of the radio devices 1 to 9 periodically gathers link state information LSIF and transmits the route announcement packet RAE including the gathered link state information LSIF to the radio device 0.

Then, based on the link state information LSIF received from the radio devices 1 to 9, the radio device 0 produces the above-described topology information TPIF and maintains the topology information TPIF.

With the present invention, unlike radio device 0 functioning as the Root radio device, the each of the radio devices 1 to 9 only gathers and transmits to the radio device 0 the link state information LSIF: none of the radio devices 1 to 9 maintains the link state information LSIF that the radio devices 1 to 9 themselves have gathered, nor produces the topology information TPIF that indicates the arrangement of all the radio devices 0 to 9 in the wireless network system 10 by receiving link state information LSIF from other radio devices (any of the radio devices 1 to 9).

With the present invention, the radio device 0 functioning as the Root radio device produces the topology information TPIF based on the link state information LSIF received from the radio devices 1 to 9 and maintains the topology information TPIF. Then, based on the maintained topology information TPIF, the radio device 0 transmits the route information of the wireless network system 10 to each of the radio devices 1 to 9.

Now, how the route for wireless communication is established between source and destination in the wireless network system 10 will be described. FIGS. 11A to 11D are schematic diagrams according to Embodiment 1 illustrating how the route for wireless communication is established between source and destination. For example, take the case where a route is established between the radio device 3 and the radio device 5.

With reference to FIGS. 11A to 11D, when the radio device 3 establishes the route toward the radio device 5, the routing daemon 23 of the radio device 3 produces a route request packet RREQ1=[ID/33/0/1/0/10/MAC Address 3/11/0/MAC Address 5/20] and transmits the produced route request packet RREQ1=[ID/33/0/1/0/10/MAC Address 3/11/0/MAC Address 5/20]to the radio device 0 through the radio device 1.

Upon receiving the route request packet RREQ1=[ID/33/0/1/0/10/MAC Address 3/11/0/MAC Address 5/20] from the radio device 3, the routing daemon 23 of the radio device 1 replaces the Number of Hops=0 to Number of Hops=1, and the Metric=0 to Metric=2 in the [ID/10/0/1/0/10/MAC Address 3/11/0/MAC Address 5/20], to produce a route request packet RREQ1=[ID/33/0/1/1/10/MAC Address 3/11/2/MAC Address 5/20]. Then, the routing daemon 23 of the radio device 1 transmits the produced route request packet RREQ1=[ID/10/0/1/1/10/MAC Address 3/11/2/MAC Address 5/20] to the radio device 0 (see FIG. 11A).

The routing daemon 23 of the radio device 0 receives the route request packet RREQ1=[ID/33/0/1/1/10/MAC Address 3/11/2/MAC Address 5/20] from the radio device 1 and extracts the SourceAddress=MAC Address 3 and the Destination Address=MAC Address 5 from the received route request packet RREQ1=[ID/33/0/1/1/10/MAC Address 3/11/2/MAC Address 5/20].

Then, the routing daemon 23 of the radio device 0 detects that the radio device 3 is requesting a route for wireless communicate with the radio device 5 and, based on the maintaining topology information TPIF, extracts the optimal route (:Radio Device 3-Radio Device 4-Radio Device 7-Radio Device 5).

In this case, the route from the radio device 3 to the radio device 5 could be, for example, Radio Device 3-Radio Device 1-Radio Device 2-Radio Device 5 or Radio Device 3-Radio Device 6-Radio Device 7-Radio Device 5, however, the routing daemon 23 of the radio device 0 extracts the Radio Device 3-Radio Device 4-Radio Device 7-Radio Device 5 as the optimal route considering the number of hops, statuses of the wireless communications carried out in the past, etc.

Figure 11A:
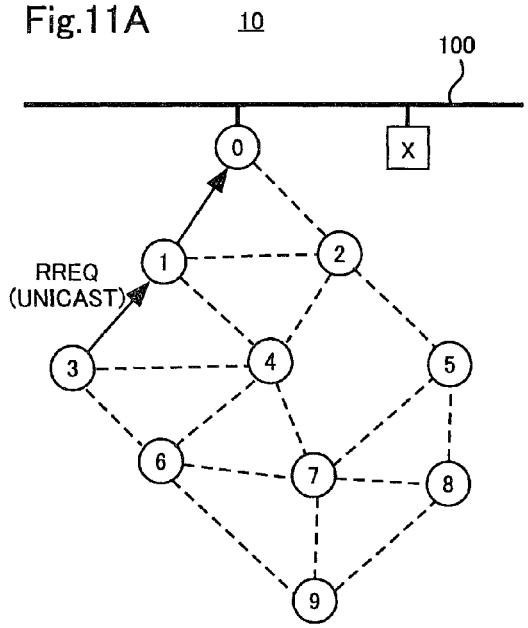
FIG. 11A is a schematic diagram according to Embodiment 1 illustrating how the route for wireless communication is established between source and destination.
Figure 11B:
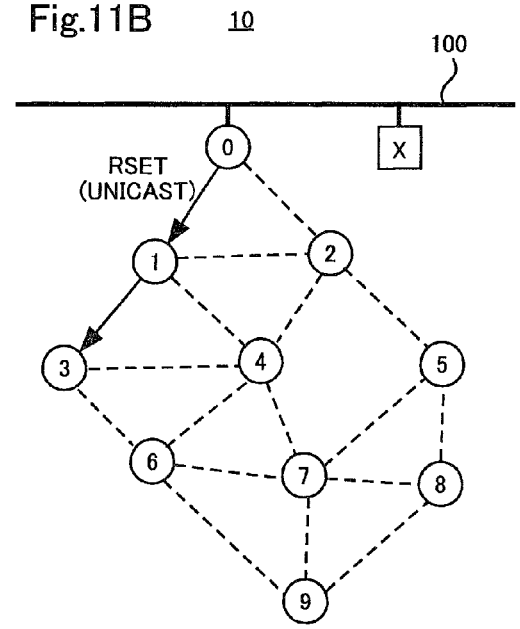
FIG. 11B is a schematic diagram according to Embodiment 1 illustrating how the route for wireless communication is established between source and destination.
Figure 11C:
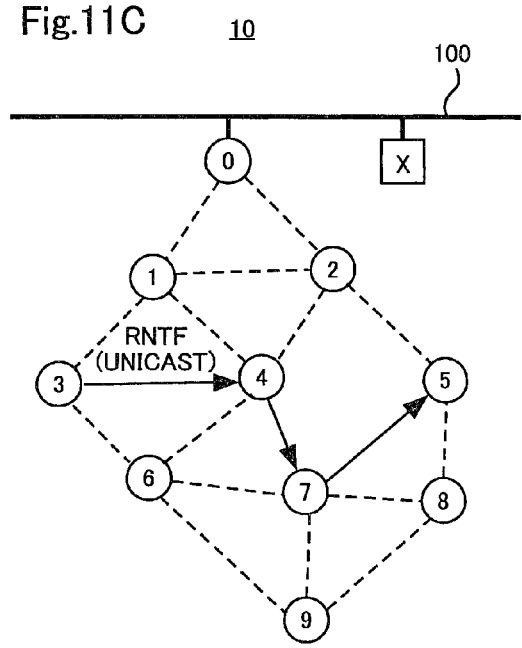
FIG. 11C is a schematic diagram according to Embodiment 1 illustrating how the route for wireless communication is established between source and destination.
Figure 11D:
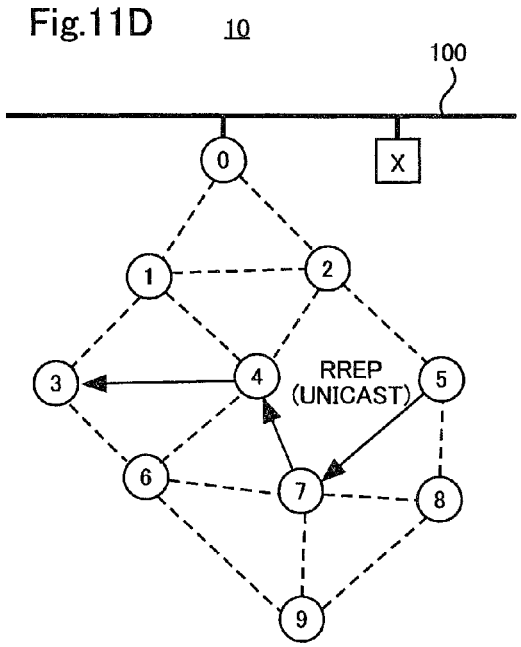
FIG. 11D is a schematic diagram according to Embodiment 1 illustrating how the route for wireless communication is established between source and destination.

Then, the routing daemon 23 of the radio device 0 produces a route setup packet RSET1=[ID/45/0/30/10/MAC Address 0/4/MAC Address 3/MAC Address 3-MAC Address 4-MAC Address 7-Address 5] and transmits the produced route setup packet RSET1=[ID/45/0/30/10/MAC Address 0/4/MAC Address 3/MAC Address 3-MAC Address 4-MAC Address 7-Address 5] to the radio device 3 through the radio device 1 (see FIG. 11B).

The routing daemon 23 of the radio device 3 receives from the radio device 0 the route setup packet RSET1=[ID/45/0/30/10/MAC Address 0/4/MAC Address 3/MAC Address 3-MAC Address 4-MAC Address 7-Address 5] and extracts the MAC Address 3-MAC Address 4-MAC Address 7-Address 5 from the received route setup packet RSET1=[ID/45/0/30/10/MAC Address 0/4/MAC Address 3/MAC Address 3-MAC Address 4-MAC Address 7-Address 5].

Based on the extracted MAC Address 3-MAC Address 4-MAC Address 7-Address 5, the routing daemon 23 of the radio device 3 recognizes that it is required by the radio device 0 to take the route Radio Device 3-Radio Device 4-Radio Device 7-Radio Device 5 for wireless communication with the radio device 5.

Upon recognizing the route for wireless communication with the radio device 5, the routing daemon 23 of the radio device 3 produces a route notification packet RNTF1=[ID/44/0/10/10/4/3/MAC Address 3/10/MAC Address 3-MAC Address 4-MAC Address 7-Address 5] notifying that wireless communication is to be carried out with the radio device 5 along the route Radio Device 3-Radio Device 4-Radio Device 7-Radio Device 5. Then, the routing daemon 23 of the radio device 3 sequentially transmits the produced route notification packet RNTF1=[ID/44/0/10/10/4/3/MAC Address 3/10/MAC Address 3-MAC Address 4-MAC Address 7-Address 5] to the radio device 4, the radio device 7 and the radio device 5.

The routing daemon 23 of the radio device 4 receives from the radio device 3 the route notification packet RNTF1=[ID/44/0/10/10/4/3/MAC Address 3/10/MAC Address 3-MAC Address 4-MAC Address 7-Address 5]. Based on the MAC Address 3-MAC Address 4-MAC Address 7-Address 5 included in the received route notification packet RNTF1=[ID/44/0/10/10/4/3/MAC Address 3/10/MAC Address 3-MAC Address 4-MAC Address 7-Address 5], the routing daemon 23 of the radio device 4 recognizes that packets from the radio device 3 must be relayed to the radio device 7. Then, the routing daemon 23 of the radio device 4 transmits the route notification packet RNTF1=[ID/44/0/10/10/4/3/MAC Address 3/10/MAC Address 3-MAC Address 4-MAC Address 7-Address 5] to the radio device 7.

The routing daemon 23 of the radio device 7 receives from the radio device 4 the route notification packet RNTF1=[ID/44/0/10/10/4/3/MAC Address 3/10/MAC Address 3-MAC Address 4-MAC Address 7-Address 5]. Based on the MAC Address 3-MAC Address 4-MAC Address 7-Address 5 included in the received route notification packet RNTF1=[ID/44/0/10/10/4/3/MAC Address 3/10/MAC Address 3-MAC Address 4-MAC Address 7-Address 5], the routing daemon 23 of the radio device 7 recognizes that packets from the radio device 4 must be relayed to the radio device 5, which is the destination. Then, the routing daemon 23 of the radio device 7 transmits the route notification packet RNTF1=[ID/44/0/10/10/4/3/MAC Address 3/10/MAC Address 3-MAC Address 4-MAC Address 7-Address 5] to the radio device 5 (see FIG. 11C).

The routing daemon 23 of the radio device 5 receives from the radio device 7 the route notification packet RNTF1=[ID/44/0/10/10/4/3IMAC Address 3/10/MAC Address 3-MAC Address 4-MAC Address 7-Address 5]. Based on the MAC Address 3 included in the received route notification packet RNTF1=[ID/44/0/10/10/4/3/MAC Address 3/10/MAC Address 3-MAC Address 4-MAC Address 7-Address 5], routing daemon 23 of the radio device 5 recognizes that the radio device 3 is the source. Further, based on the MAC Address 3-MAC Address 4-MAC Address 7-Address 5, the routing daemon 23 of the radio device 5 recognizes the radio device 5 as the destination, and the route for wireless communication with the radio device 3.

Then, the routing daemon 23 of the radio device 5 produces a route reply packet RREP1=[ID/32/0/1/MAC Address 5/40/2/0/MAC Address 3/10] and transmits the produced route reply packet RREP1=[ID/32/0/1/MAC Address 5/40/2/0/MAC Address 3/10] to the radio device 3 along the route Radio Device 3-Radio Device 4-Radio Device 7-Radio Device 5.

The radio device 7 receives from the radio device 5 the route reply packet RREP1=[ID/32/0/1/MAC Address 5/40/2/0/MAC Address 3/10] and relays the received route reply packet RREP1=[ID/32/0/1/MAC Address 5/40/2/0/MAC Address 3/10] to the radio device 4. The radio device 4 receives from the radio device 7 the route reply packet RREP1=[ID/32/0/1/MAC Address 5/40/2/0/MAC Address 3/10] and relays the received route reply packet RREP1=[ID/32/0/1/MAC Address 5/40/2/0/MAC Address 3/10] to the radio device 3 (see FIG. 11D).

The routing daemon 23 of the radio device 3 receives from the radio device 4 the route reply packet RREP1=[ID/32/011/MAC Address 5/40/2/0/MAC Address 3/10]. Based on the MAC Address 5(=the Destination Address) included in the received route reply packet RREP1=[ID/32/0/1/MAC Address 5/40/2/0/MAC Address 3/10], the routing daemon 23 of the radio device 3 recognizes that the route Radio Device 3-Radio Device 4-Radio Device 7-Radio Device 5 has been established toward the radio device 5, which is the destination.

FIG. 12 shows another example of the routing table 20. When the route to the radio device 5 is established, the routing daemon 23 of the radio device 3 produces a routing table 20A (see FIG. 12) in which the destination is set to the radio device 5, the radio device adjacent to the radio device 3 is set to the radio device 4, and the number of hops to the radio device 5 is set to 3.

As described above, in order to establish a route for wireless communication with the radio device 5, the radio device 3 transmits the route request packet RREQ1 to the radio device 0 functioning as the Root radio device and receives from the radio device 0 the route setup packet RSET1 including the route information (=the MAC Address 3/10/MAC Address 3-MAC Address 4-MAC Address 7-Address 5) indicating the route between the radio device 3 and the radio device 5. Then, upon receiving the route setup packet RSET1 from the radio device 0, the radio device 3 produces the route notification packet RNTF notifying the radio devices 4, 7 and 5 of the route established toward the radio device 5 and transmits the packet to the radio devices 4, 7 and 5.

Then, the radio device 5, which is the destination, receives the route notification packet RNTF1 from the radio device 3. Then, in response to the reception of the route notification packet RNTF1, the radio device 5 produces the route reply packet RREP1 and transmits the packet to the radio devices 7, 4 and 3.

Therefore, a load is applied to the radio device 0 as it determines the route between the radio device 3 and radio device 5, however, no load is applied to the radio devices 3, 4, 7, and 5, which results in load reduction in the overall wireless network system 10.

Here, upon receiving the route notification packet RNTF from the radio device 4, the radio device 7 may produce the route request packet RREQ and transmit it to the radio device 5, which is the destination. In this case, the destination radio device 5 produces the route reply packet RREP and transmits the packet to the radio device 7 in response to the route request packet RREQ from the radio device 7.

As is the case with the radio device 3, the other radio devices (any of the radio devices 1, 2, and 4 to 9) also establish the routes for wireless communication with their respective destinations following the above-described operation.

When the radio device 0 functioning as the Root radio device carries out wireless communication with the other radio devices (any of the radio devices 1 to 9), after selecting the route to the destination based on the topology information TPIF, the radio device 0 produces the route notification packet RNTF. Then, the radio device 0 transmits the produced route notification packet RNTF to the destination and receives the route reply packet RREP form the destination. In this way, the route for wireless communication is established between the radio device 0 and the destination.

[Another Method of Establishing Route]

The radio device 3 may establish the route for wireless communication with the radio device 5 in accordance with the method described below. FIGS. 13A to 13D illustrate another example of the routing table 20. When establishing the route with this method described below, the radio device 0 functioning as the Root radio device produces the routing table 20 in which the destination is each of the radio devices 1 to 9 in the wireless network system 10. Then, the radio device 0 transmits the produced routing table to each of the radio devices 1 to 9.

With reference to FIGS. 13A to 13D, the routing table 20B is obtained when each of the radio devices 0, and 2 to 9 is the destination of the radio device 1. The routing table 20C is obtained when each of the radio devices 0, 1, 2, and 4 to 9 is the destination of the radio device 3. The routing table 20D is obtained when each of the radio devices 1 to 3, and 5 to 9 is the destination of the radio device 4. The routing table 20E is obtained when each of the radio devices 1 to 6, 8, and 9 is the destination of the radio device 7.

The radio device 0 produces the routing tables 20B, 20C, 20D, and 20E and transmits the produced routing tables 20B, 20C, 20D, and 20E to the radio devices 1, 3, 4, and 7, respectively.

It should be noted that although not illustrated in FIGS. 13A to 13D, the radio device 0 also produces routing tables indicating the routes from the radio devices 2, 5, 6, 8, and 9 to their respective destinations and transmits the produced routing tables to the radio devices 2, 5, 6, 8, and 9.

When radio device 3 establishes the route for wireless communication with the radio device 5, the routing daemon 23 of the radio device 3 determines the route to the radio device 5 by looking-up the routing table 20C. Then, after determining the route to the radio device 5, the routing daemon 23 of the radio device 3 produces the route notification packet RNTF1 and transmits the packet to the radio device 4.

Upon receiving the route notification packet RNTF1 from the radio device 3, the routing daemon 23 of the radio device 4 determines the route to transmits the route notification packet RNTF1 to the radio device 5 by looking-up the routing table 20D. Then, the routing daemon 23 of the radio device 4 transmits the route notification packet RNTF1 along the determined route.

Upon receiving the route notification packet RNTF1 from the radio device 4, the routing daemon 23 of the radio device 7 determines the route to transmit the route notification packet RNTF1 to the radio device 5 by looking-up the routing table 20E. Then, the routing daemon 23 of the radio device 7 transmits the route notification packet RNTF1 to the radio device 5 along the determined route.

Upon receiving the route notification packet RNTF1, the routing daemon 23 of the radio device 5 produces the route reply packet RREP1 and transmits the produced route reply packet RREP1 to the radio device 3 along the route Radio Device 5-Radio Device 7-Radio Device 4-Radio Device 3. When the radio device 3 receives the route reply packet RREP1, the route for wireless communication between the radio device 3 and the radio device 5 is established.

As described above, when each of the radio devices 1 to 9 maintains the routing table 20 in which the destination is each of the radio devices, none of the radio devices 1 to 9 have to ask the radio device 0, which functions as the Root radio device, for the route information in order to wirelessly communicate with their destination. Therefore, the load to the radio devices 1 to 9 is further reduced.

[Embodiment 2]

Figure 14:
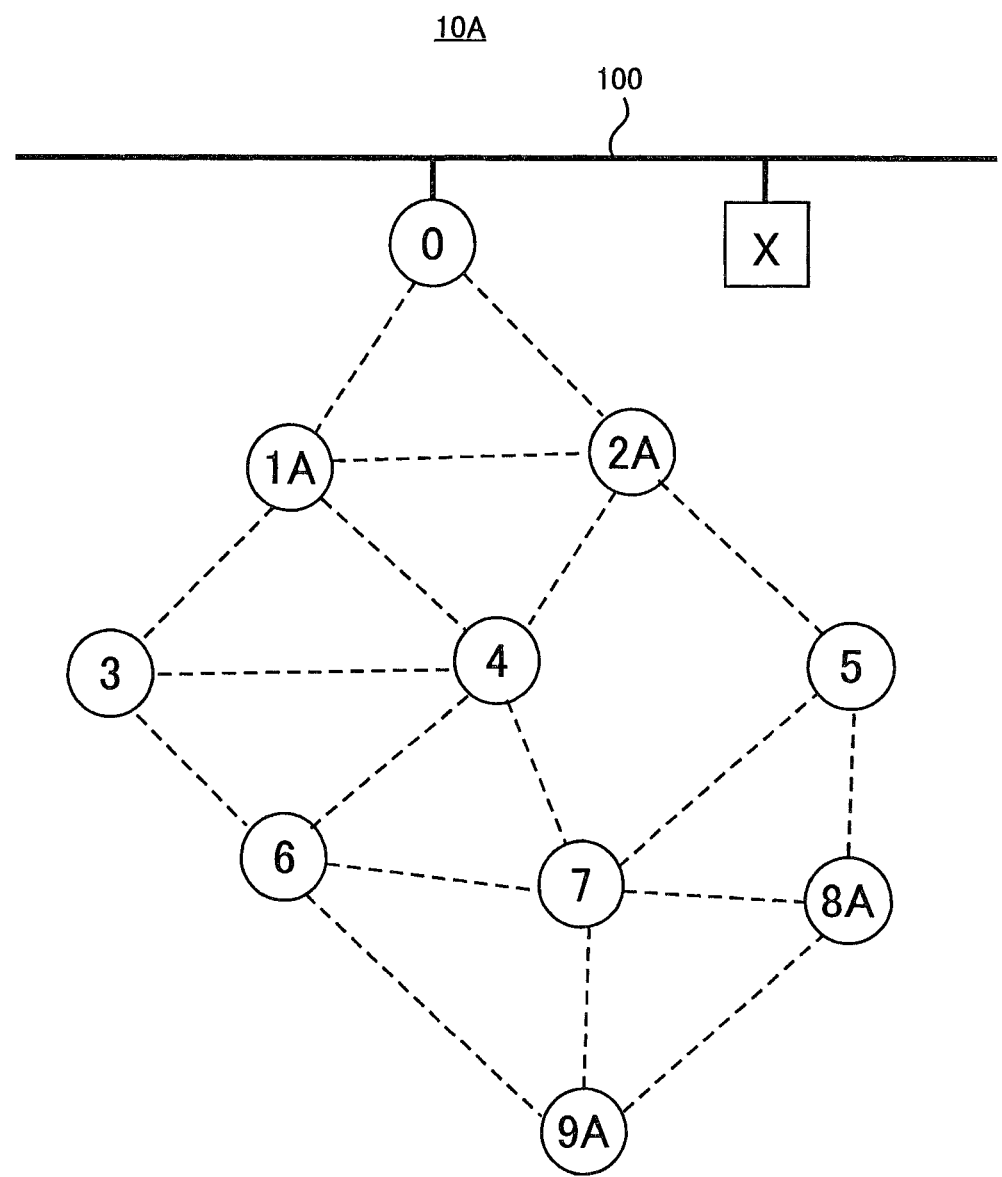
FIG. 14 is a schematic diagram of a wireless network system according to Embodiment 2.

FIG. 14 is a schematic diagram of a wireless network system according to Embodiment 2. With reference to FIG. 14, the wireless network system 10A is identical with the wireless network system 10 shown in FIG. 1 except that the radio devices 1, 2, 8, and 9 of the wireless network system 10 are replaced with the radio devices 1A, 2A, 8A, and 9A, respectively.

FIG. 15 is a schematic block diagram illustrating the structure of the radio devices 1A, 2A, 8A, and 9A shown in FIG. 14. Each of the radio devices 1A, 2A, 8A, and 9A is unsuitable to wireless communication based on the link state information LSIF. Accordingly, each of the radio devices 1A, 2A, 8A, and 9A has the same structure as the radio devices 0 to 9 except that the routing table 20 is removed (see FIG. 2 and FIG. 15).

As a result, the wireless network system 10A comprises the radio devices 0, and 3 and 7 suitable to wireless communication based on the link state information LSIF, and the radio devices 1A, 2A, 8A, and 9A unsuitable to wireless communication based on the link state information LSIF.

Here, the radio device 0 also functions as the Root radio device in the wireless network system 10A.

Figure 16A:
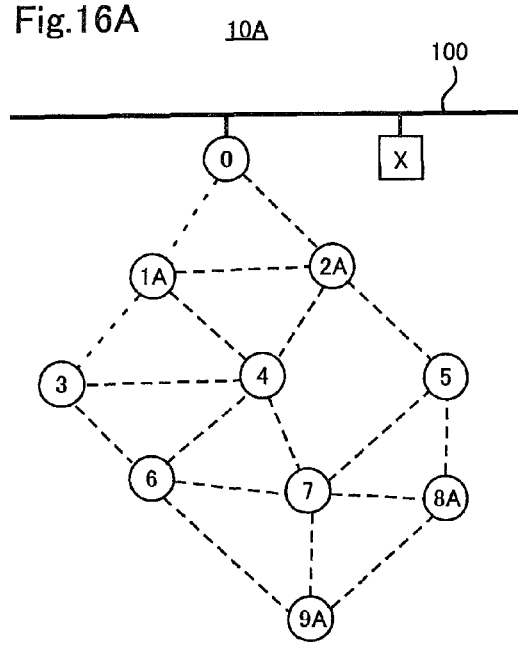
FIG. 16A illustrates how the Root radio device gathers link state information in Embodiment 2.

FIGS. 16A to 16D illustrate how the Root radio device gathers link state information LSIF in Embodiment 2. With reference to FIG. 16A, the radio devices 0, 1A, 2A, 3 to 7, 8A, and 9A constitute the wireless network system 10A.

Figure 16B:
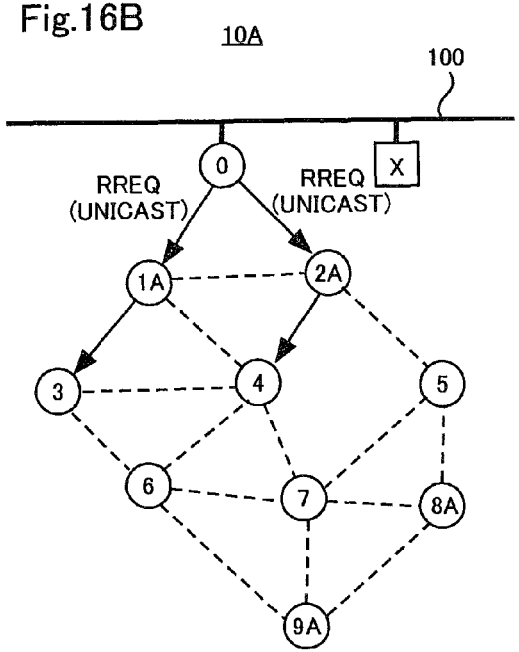
FIG. 16B illustrates how the Root radio device gathers link state information in Embodiment 2.
Figure 16C:
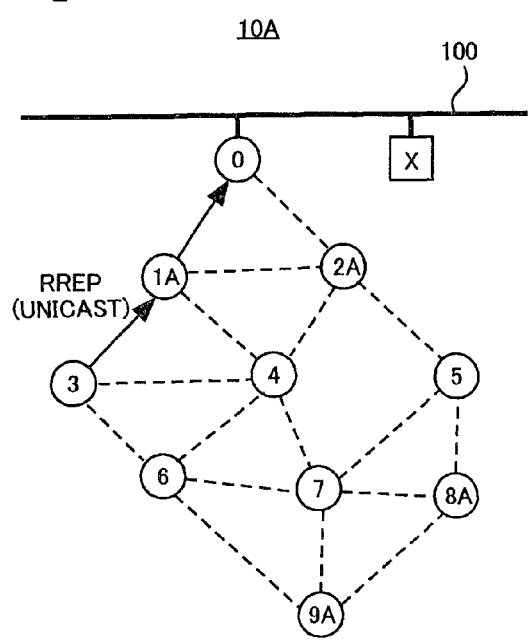
FIG. 16C illustrates how the Root radio device gathers link state information in Embodiment 2.
Figure 16D:
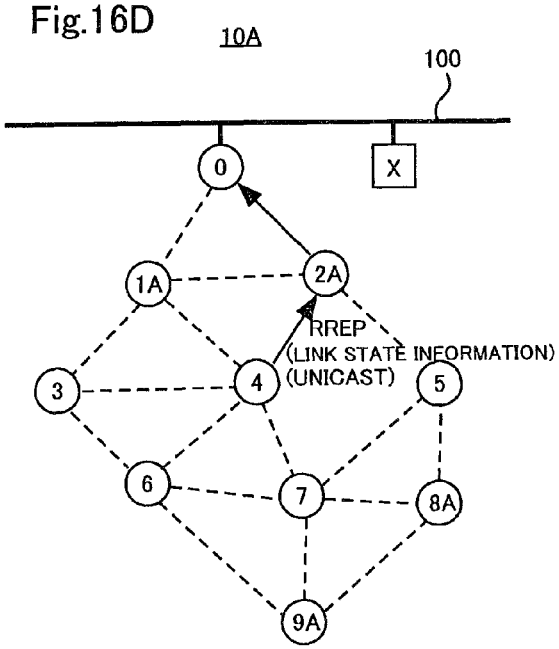
FIG. 16D illustrates how the Root radio device gathers link state information in Embodiment 2.

Under this configuration, the radio device 0 which is the Root radio device periodically produces the route request packets RREQ and unicasts the produced route request packets RREQ to each of the radio devices 1A, 2A, 3 to 7, 8A, and 9A (see FIG. 16B).

More specifically, the routing daemon 23 of the radio device 0 sequentially produces nine route request packets RREQ by setting the Destination Address #1 to Destination Address #N of the route request packets RREQ (see FIG. 4) to the MAC addresses (MAC Address 1A, MAC Address 2A, MAC Address 3 to MAC Address 7, MAC Address 8A, and MAC Address 9A) of each radio device 1A, 2A, 3 to 7, 8A, and 9A. Then, the routing daemon 23 of the radio device 0 unicasts the produced nine route request packets RREQ to the radio devices 1A, 2A, 3 to 7, 8A, and 9A, respectively.

Accordingly, the radio devices 1A, 2A, 3 to 7, 8A, and 9A periodically receive the route request packet RREQ from the radio device 0. Among the radio devices 1A, 2A, 3 to 7, 8A, and 9A, the radio devices 1A, 2A, 8A, and 9A are unsuitable to wireless communication based on the link state information LSIF. Therefore, the radio devices 1A, 2A, 8A, and 9A each produce the route reply packet RREP indicating that the radio devices 1A, 2A, 8A, and 9A themselves are unsuitable to wireless communication based the link state information LSIF. Then, the radio devices 1A, 2A, 8A, and 9A each unicast the packet to the radio device 0 (see FIG. 16C).

On the other hand, among the radio devices 1A, 2A, 3 to 7, 8A, and 9A, the radio devices 3 to 7 are suitable to wireless communication based on the link state information LSIF. Therefore, the radio devices 3 to 7 produce the route reply packet RREP including periodically gathered link state information LSIF and unicast the packet to the radio device 0 (see FIG. 16D).

As a result, the radio device 0 receives the link state information LSIF from the radio devices 3 to 7 suitable to wireless communication based on the link state information LSIF. Based on the received link state information LSIF, the radio device 0 produces and maintains the topology information TPIF indicating the arrangement of all the radio devices 1A, 2A, 3 to 7, 8A, and 9A in the wireless network system 10A.

Further, the radio device 0 recognizes that among the radio devices 1A, 2A, 3 to 7, 8A, and 9A constituting the wireless network system 10A, the radio devices 1A, 2A, 8A, and 9A are unsuitable to wireless communication based on the link state information LSIF and that the radio devices 3 to 7 are suitable to wireless communication based on the link state information LSIF.

It should be noted that in Embodiment 2, a radio device that is suitable to wireless communication based on the link state information LSIF is denoted by LS, and a radio device that is unsuitable to wireless communication based on the link state information LSIF is denoted by NLS. Therefore, when the radio device 0 produces the topology information TPIF based on the link state information LSIF received from the radio devices 3 to 7, the radio devices 3 to 7 are denoted by Radio Device 3 (LS), Radio Device 4 (LS), Radio Device 5 (LS), Radio Device 6 (LS), and Radio Device 7 (LS) to indicate that they are the radio device LSs. Likewise, the radio devices 1A, 2A, 8A, and 9A are denoted by Radio Device 1A (NLS), Radio Device 2A (NLS), Radio Device 8A (NLS), and Radio Device 9A (NLS) to indicated that they are radio device NLSs.

Therefore, when the radio device 0 extracts the route between source and destination in response to the route request packet RREQ, it is easily determined whether the respective radio devices constituting the route are the radio device LS or the radio device NLS.

FIGS. 17A to 17D are schematic diagrams according to Embodiment 2 illustrating how the route for wireless communication is established between source and destination. How the route for wireless communication between the radio device 3 and the radio device 5 is established is described below.

Figure 17A:
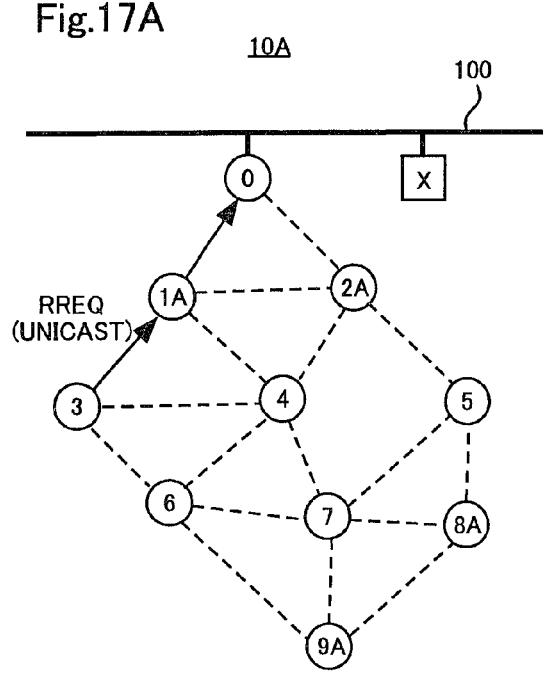
FIG. 17A is a schematic diagram according to Embodiment 2 illustrating how the route for wireless communication is established between source and destination.

With reference to FIG. 17A, the radio device 3 produces the route request packet RREQ1 and transmits the packet to the radio device 0 following the same operation as is explained in Embodiment 1.

Figure 17B:
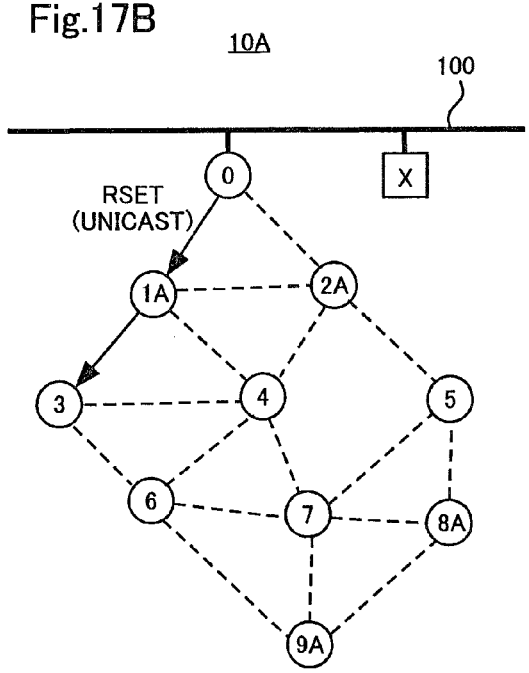
FIG. 17B is a schematic diagram according to Embodiment 2 illustrating how the route for wireless communication is established between source and destination.
Figure 17C:
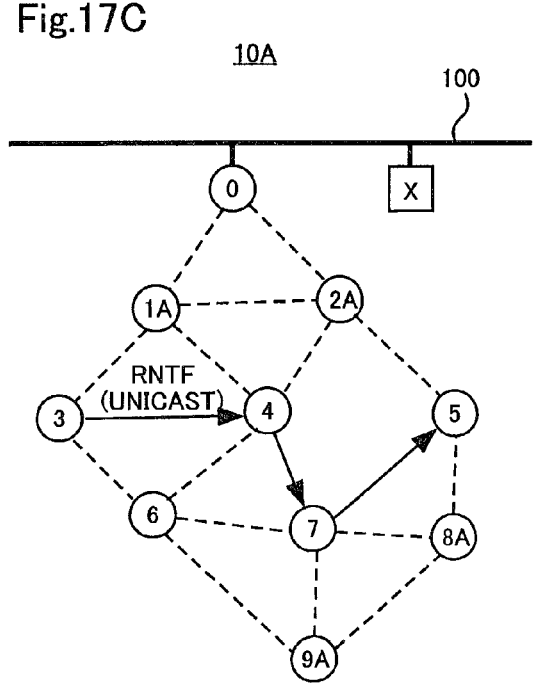
FIG. 17C is a schematic diagram according to Embodiment 2 illustrating how the route for wireless communication is established between source and destination.

Upon receiving the route request packet RREQ1 from the radio device 3, the radio device 0 produces the route setup packet RSET1 and transmits the packet to the radio device 3 following the same operation as is explained in Embodiment 1 (see FIG. 17B). In this case, the route setup packet RSET1 includes route information consisting of MAC Address 3 (LS)-MAC Address 4 (LS)-MAC Address 7 (LS)-MAC Address 5 (LS). More specifically, the route setup packet RSET1 includes information that indicates whether the radio devices 3, 4, 7, and 5, which constitute the route set by the radio device 0, are the radio device LS or the radio device NLS.

The radio device 3 receives the route setup packet RSET1 from the radio device 0. Then, in response to the reception of the route setup packet RSET1, the radio device 3 produces the route notification packet RNTF1 and transmits the produced route notification packet RNTF1 to the radio device 5 along the route Radio Device 3-Radio Device 4-Radio Device 7-Radio Device 5, following the same operation as is explained in Embodiment 1 (see FIG. 17C). In this case, the route notification packet RNTF1 includes MAC Address 3 (LS)-MAC Address 4 (LS)-MAC Address 7 (LS)-MAC Address 5 (LS).

Figure 17D:
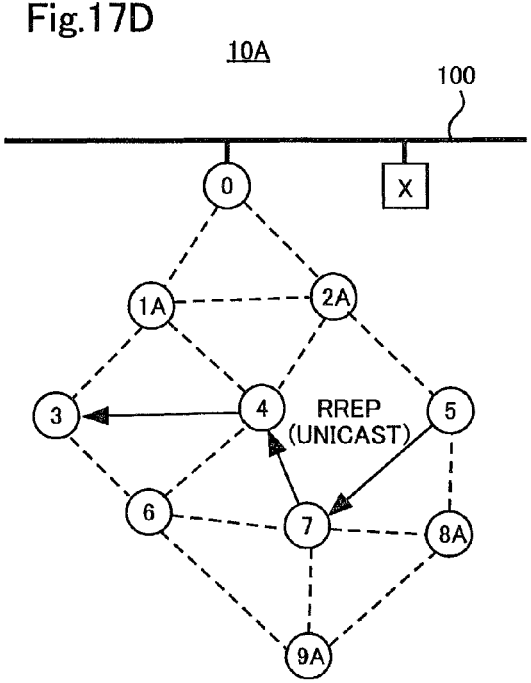
FIG. 17D is a schematic diagram according to Embodiment 2 illustrating how the route for wireless communication is established between source and destination.

Upon receiving the route notification packet RNTF1 from the radio device 3, the radio device 5 produces the route reply packet RREP1 and transmits the packet to the radio device 3 following the same operation as is explained in Embodiment 1 (see FIG. 17D).

The radio device 3 receives the route reply packet RREP1 from the radio device 5, and the route for wireless communication between the radio device 3 and radio device 5 is established.

As described above, in the wireless network system 10A, when receiving the route request packet RREQ1 from the radio device 3 that is suitable to wireless communication based on the link state information LSIF, the radio device 0 functioning as the Root radio device transmits the route setup packet RSET1 to the radio device 3 that has transmitted the route request packet RREQ1.

In the above, it is explained that the radio device 7 relays the route notification packet RNTF1 received from the radio device 4 to the radio device 5. With the present invention, however, that is not always the case and, upon receiving the route notification packet RNTF1 from the radio device 4, the radio device 7 may produce the route request packet RREQ1 and transmit the packet to the radio device 5. In this way, the radio device 7 is no longer required to determine whether the radio device 5 is the radio device LS or the radio device NLS.

More specifically, as described above, the route notification packet RNTF1 includes the MAC Address 3 (LS)-MAC Address 4 (LS)-MAC Address 7 (LS)-MAC Address 5 (LS) and therefore, the radio device 7 is able to determine whether the radio device 5 is the radio device LS or the radio device NLS by looking-up the MAC Address 3 (LS)-MAC Address 4 (LS)-MAC Address 7 (LS)-MAC Address 5 (LS) included in the route notification packet RNTF1. When the radio device 7 produces the route request packet RREQ1 and transmits the packet to the radio device 5, however, it is not necessary to determine whether the radio device 5 is the radio device LS or the radio device NLS. This is because the route notification packet RNTF is recognized by the radio device LS only, and the route request packet RREQ is recognized by both of the radio device LS and the radio device NLS.

FIGS. 18A to 18D are other schematic diagrams according to Embodiment 2 illustrating how the route for wireless communication is established between source and destination. With reference to FIGS. 18A to 18D, how the route for wireless communication between the radio device 1A and the radio device 8A is established is described below.

Figure 18A:
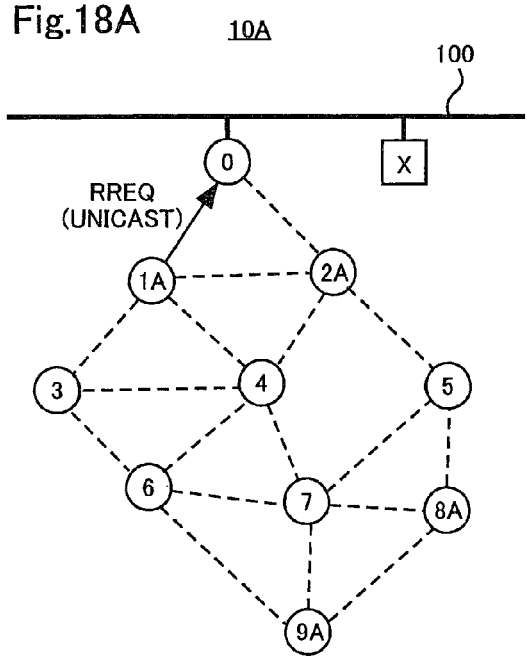
FIG. 18A is another schematic diagram according to Embodiment 2 illustrating how the route for wireless communication is established between source and destination.

The routing daemon 23 of the radio device 1A produces a route request packet RREQ2[ID/33/0/1/1/10/MAC Address 1A/11/2/MAC Address 8A/50] and unicasts the packet to the radio device 0 following the same operation as the radio device 3 in accordance with Embodiment 1 (see FIG. 18A).

The routing daemon 23 of the radio device 0 receives from the radio device 1 the route request packet RREQ2=[ID/33/0/1/1/10/MAC Address 1A/11/2/MAC Address 8A/50] and extracts the Source Address=MAC Address 1A and the Destination Address=MAC Address 8A from the received route request packet RREQ2=[ID/33/0/1/1/10/MAC Address 1A/11/2/MAC Address 8A/50].

Then, the routing daemon 23 of the radio device 0 detects that the radio device 1A is requesting a route for wireless communication with the radio device 8A and, based on the maintaining topology information TPIF, extracts the optimal route (=Radio Device 1A-Radio Device 4-Radio Device 7-Radio Device 8A).

Here, the route from the radio device 1A to the radio device 8A could be Radio Device 1A-Radio Device 2A-Radio Device 5-Radio Device 8A or Radio Device 1A-Radio Device 3-Radio Device 6-Radio Device 7-Radio Device 8A, for example. The routing daemon 23 of the radio device 0 extracts, however, the route Radio Device 1A-Radio Device 4-Radio Device 7-Radio Device 8A as the optimal route considering the number of hops, statuses of wireless communications carried out in the past, etc.

Figure 18B:
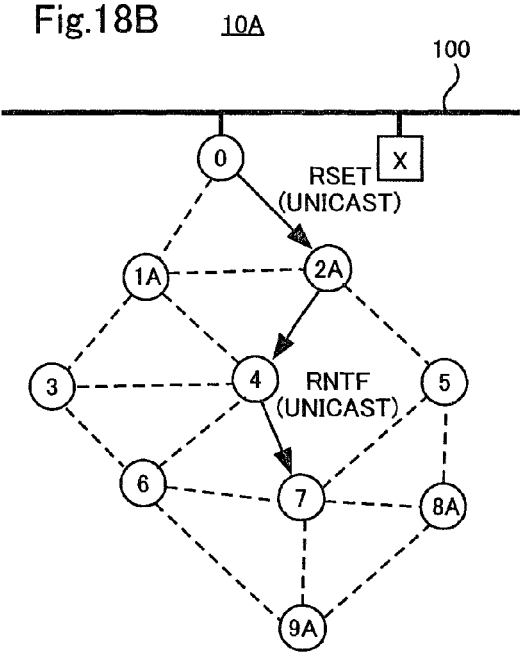
FIG. 18B is another schematic diagram according to Embodiment 2 illustrating how the route for wireless communication is established between source and destination.

Then, the routing daemon 23 of the radio device 0 produces a route setup packet RSET2=[ID/45/0/30/10/MAC Address 0/4/MAC Address 1A/MAC Address 1A (NLS)-MAC Address 4 (LS)-MAC Address 7 (LS)-MAC Address 8A (NLS)] and transmits the produced route setup packet RSET2=[ID/45/0/30/10/MAC Address 0/4/MAC Address 1A/MAC Address 1A (NLS)-MAC Address 4 (LS)-MAC Address 7 (LS)-MAC Address 8A (NLS)] to the radio device 4 through the radio device 2A (see FIG. 18B).

Here, the radio device 1A, which is the source, is the radio device NLS that is unsuitable to wireless communication based on the link state information LSIF and therefore, it is not able to recognize the route setup packet RSET2. Accordingly, the radio device 0 transmits the route setup packet RSET2 to the radio device 4 which is adjacent to the radio device 1A and is the radio device LS.

The routing daemon 23 of the radio device 4 receives the route setup packet RSET2=[ID/45/0/30/10/MAC Address 0/4/MAC Address 1A/MAC Address 1A (NLS)-MAC Address 4 (LS)-MAC Address 7 (LS)-MAC Address 8A (NLS)] from the radio device 0 through the radio device 2A and extracts the MAC Address 1A/MAC Address 1A (NLS)-MAC Address 4 (LS)-MAC Address 7 (LS)-MAC Address 8A (NLS) from the received route setup packet RSET2=[ID/45/0/30/10/MAC Address 0/4/MAC Address 1A/MAC Address 1A (NLS)-MAC Address 4 (LS)-MAC Address 7 (LS)-MAC Address 8A (NLS)].

Based on the extracted MAC Address 1A/MAC Address 1A (NLS)-MAC Address 4 (LS)-MAC Address 7 (LS)-MAC Address 8A (NLS), the routing daemon 23 of the radio device 4 recognizes that it is required by the radio device 0 to take the route Radio Device 1A-Radio Device 4-Radio Device 7-Radio Device 8A for wireless communication with the Radio Device 8A.

Upon recognizing the route for wireless communication with the radio device 8A, the routing daemon 23 of the radio device 4 produces a route notification packet RNTF2=[ID/44/0/10/10/4/3/MAC Address 4/10/MAC Address 1A/MAC Address 1A (NLS)-MAC Address 4 (LS)-MAC Address 7 (LS)-MAC Address 8A (NLS)] notifying that wireless communication is carried out with the radio device 8A along the route Radio Device 1A-Radio Device 4-Radio Device 7-Radio Device 8A and transmits the produced route notification packet RNTF2=[ID/44/0/10/10/4/3/MAC Address 4/10/MAC Address 1A/MAC Address 1A (NLS)-MAC Address 4 (LS)-MAC Address 7 (LS)-MAC Address 8A (NLS)] to the radio device 7.

The routing daemon 23 of the radio device 7 receives from the radio device 4 the route notification packet RNTF2=[ID/44/0/10/10/4/3/MAC Address 4/10/MAC Address 1A/MAC Address 1A (NLS)-MAC Address 4 (LS)-MAC Address 7 (LS)-MAC Address 8A (NLS)]. Then, based on the MAC Address 1A/MAC Address 1A (NLS)-MAC Address 4 (LS)-MAC Address 7 (LS)-MAC Address 8A (NLS) included in the received route notification packet RNTF2=[ID/44/0/10/10/4/3/MAC Address 4/10/MAC Address 1A/MAC Address 1A (NLS)-MAC Address 4 (LS)-MAC Address 7 (LS)-MAC Address 8A (NLS)], the routing daemon 23 of the radio device 7 recognizes that packets received from the radio device 4 must be relayed to the radio device 8A and that the radio device 8A is a radio device LS.

Figure 18C:
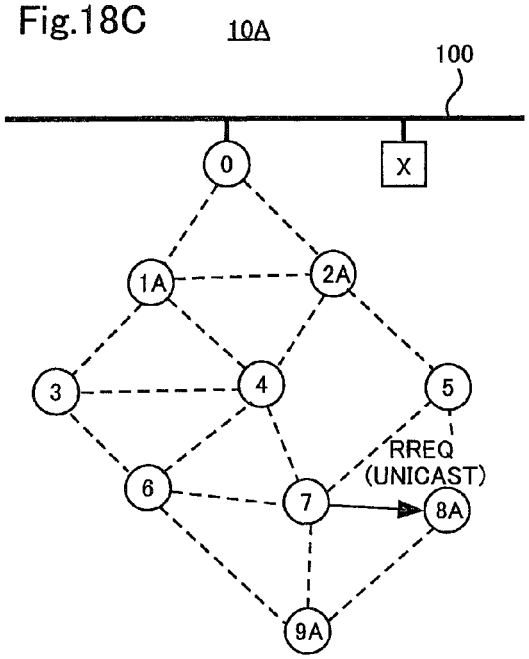
FIG. 18C is another schematic diagram according to Embodiment 2 illustrating how the route for wireless communication is established between source and destination.

Then, the routing daemon 23 of the radio device 7 produces a route request packet RREQ3=[ID/44/0/1/0/60/MAC Address 7/60/0/MAC Address 8A (NLS)/70] and unicasts the packet to the radio device 8A (see FIG. 18C).

The routing daemon 23 of the radio device 8A receives from the radio device 7 the route request packet RREQ3=[ID/44/0/1/0/60/MAC Address 7/60/0/MAC Address 8A (NLS)/70] and, based on the MAC Address 8A included in the received route request packet RREQ3=[ID/44/0/1/0/60/MAC Address 7/60/0/MAC Address 8A (NLS)/70],recognizes that the radio device 8A is the destination and that a route reply packet RREP2 must be transmitted to the radio device 7.

Figure 18D:
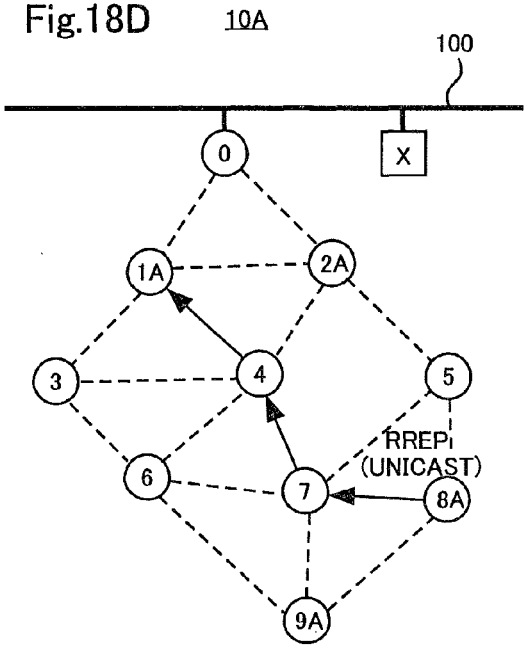
FIG. 18D is another schematic diagram according to Embodiment 2 illustrating how the route for wireless communication is established between source and destination.

Then, the routing daemon 23 of the radio device 8A produces the route reply packet RREP2=[ID/32/0/1/MAC Address 8A/70/4/0/MAC Address 7/70] and transmits the produced route reply packet RREP2=[ID/32/0/1/MAC Address 8A/70/4/0/MAC Address 7/70] to the radio device 7 (see FIG. 18D).

The radio device 7 receives from the radio device 8A the route reply packet RREP2=[ID/32/0/1/MAC Address 8A/70/4/0/MAC Address 7/70] and relays the received route reply packet RREP2=[ID/32/0/1/MAC Address 8A/70/4/0/MAC Address 7/70] to the radio device 4. The radio device 4 receives from the radio device 7 the route reply packet RREP2=[ID/32/0/1/MAC Address 8A/70/410/MAC Address 7/70] and relays the received route reply packet RREP2=[ID/32/0/1/MAC Address 8A/70/4/0/MAC Address 7/70] to the radio device 1A.

Then, the routing daemon 23 of the radio device 1A receives from the radio device 4 the route reply packet RREP2=[ID/32/0/1/MAC Address 8A/70/4/0/MAC Address 7/70] and, based on the MAC Address 8A (=the Destination Address) included in the received route reply packet RREP2=[ID/32/0/1/MAC Address 8A/70/4/0/MAC Address 7/70], recognizes that the route for wireless communication with the radio device 8A, which is the destination, has been established.

As described above, if the source radio device is unsuitable to wireless communication based on the link state information LSIF, the radio device 0 functioning as the Root radio device transmits the route setup packet RSET to a radio device (=the radio device 4) that is adjacent to the source and is suitable to wireless communication based on the link state information LSIF. In response to the reception of the route setup packet RSET, the radio device 4 produces and transmits the route notification packet RNTF.

The radio device 8A, which is the destination, is unsuitable to wireless communication based on the link state information LSIF. Therefore, in response to the reception of the route notification packet RNTF, the radio device 7 adjacent, on the route, to the radio device 8A, which is the destination, produces a route request packet RREQ and transmits the packet to the radio device 8A that is the destination. The radio device 8A then produces and transmits the route reply packet RREP in response to the reception of the route request packet RREQ.

In this way, even when the source and/or the destination is a radio device that is unsuitable to wireless communication based on the link state information LSIF, the route for wireless communication could be established between source and destination along the route set by the radio device 0.

It should be noted that, in Embodiment 2, the radio device 0 may also produce a routing table in which the sources are each of the radio devices 3 to 7 suitable to wireless communication based on the link state information LSIF and the destinations are each of the radio devices 1A, 2A, 3 to 7, 8A, and 9A, and transmit the produced routing table to the radio devices 3 to 7. Based on the routing table received from the radio device 0, the radio devices 3 to 7 may establish the route for wireless communication with their respective destinations.

According to Embodiment 2, even when the network comprises the radio devices 3 to 7 suitable to wireless communication based on the link state information and the radio devices 1A, 2A, 8A, and 9A unsuitable to wireless communication based on the link state information, the radio device 0 functioning as the Root radio device produces and maintains the topology information TPIF that indicates the arrangement of all the radio devices 0, 1A, 2A, 3 to 7, 8A, and 9A in the wireless network system 10A. Then, in response to route requests from the radio devices 1A, 2A, 3 to 7, 8A, and 9A, the radio device 0 extracts the optimal routes by looking-up the topology information TPIF and transmits to the radio devices 3 to 7 the route information indicating the extracted optimal routes. The radio devices 3 to 7 establish the routes for wireless communication between source and destination.

Therefore, the load to the radio devices 1A, 2A, 3 to 7, 8A, and 9A is reduced, which results in load reduction in the overall wireless network system 10A.

Here, preferably, the wireless network system 10A is configured so that the radio devices 3 to 7, which are suitable to wireless communication based on the link state information LSIF are adjacent to the radio devices 1A, 2A, 8A, and 9A, which are unsuitable to wireless communication based on the link state information LSIF. With such a configuration, when the route is established for wireless communication between source and destination, the plurality of radio devices that are unsuitable to wireless communication based on the link state information LSIF will never be adjacent to each other on the route. Therefore, even when the source is a radio device unsuitable to wireless communication based on the link state information LSIF, the radio device 0 is only required to transmits the route setup packet RSET to a radio device that is adjacent to the source and is suitable to wireless communication based on the link state information LSIF, and the route is established between source and destination with accuracy.

Figure 19:
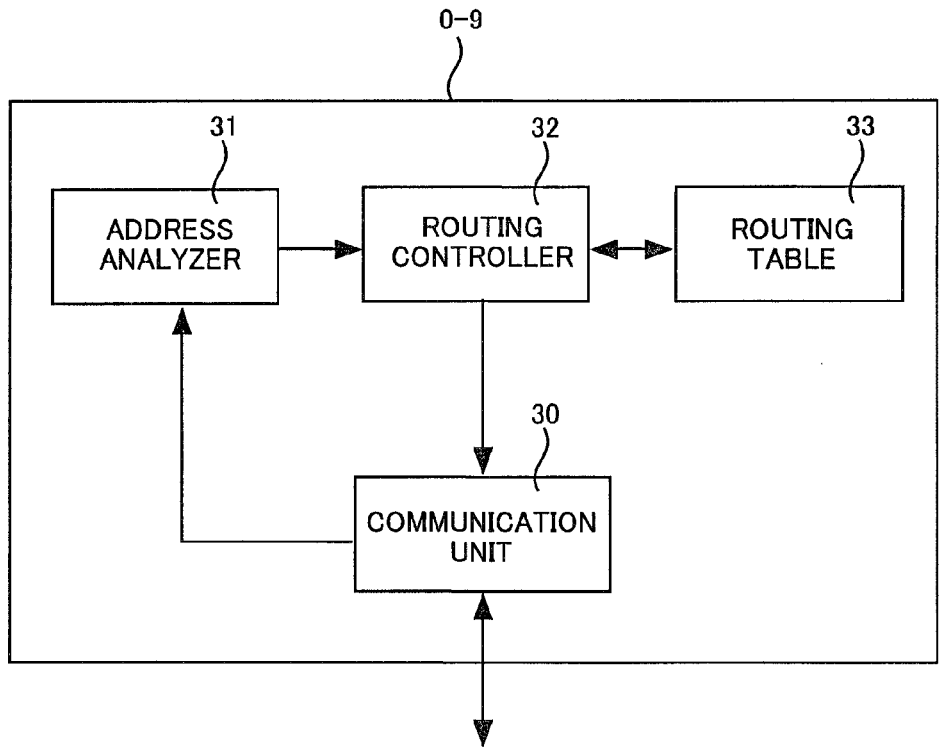
FIG. 19 is another schematic block diagram illustrating the structure of the radio devices shown in FIG. 1.

It should be noted that, in the above, it is explained that the radio devices 0 to 9 have the structure shown in FIG. 2. With the present invention, however, that is not always the case, and the radio devices 0 to 9 may have the structure as shown in FIG. 19. FIG. 19 is another schematic block diagram illustrating the structure of the radio devices 0 to 9 shown in FIG. 1.

With reference to FIG. 19, each of the radio devices 0 to 9 comprises a communication unit 30, an address analyzer 31, a routing controller 32, and a routing table 33.

The communication unit 30 transmits/receives the packet PKT, the route request packet RREQ, the route reply packet RREP, the route setup packet RSET, the route notification packet RNTF, and the route announcement packet RAE and transmits to the address analyzer 31 the received packet PKT, route request packet RREQ, route reply packet RREP, route setup packet RSET, route notification packet RNTF and route announcement packet RAE.

The address analyzer 31 analyzes the addresses of the packet PKT, the route request packet RREQ, the route reply packet RREP, the route setup packet RSET, the route notification packet RNTF, and the route announcement packet RAE, which are received from the communication unit 30, and transmits the analysis result to the routing controller 32.

Based on the analysis result received from the address analyzer 31, the routing controller 32 produces and maintains the topology information TPIF. Then, based on the topology information TPIF, the routing controller 32 produces the route setup packet RSET including route information that indicates the route for wireless communication between source and destination, and transmits the packet to the communication unit 30.

Upon receiving from the address analyzer 31 the MAC address of a radio devices constituting the route indicated by the route information included in the route setup packet RSET, the routing controller 32 also produces the routing table 33 based on the received MAC address.

Further, based on the analysis result received from the address analyzer 31, the routing controller 32 produces the above-described route request packet RREQ, route reply packet RREP, and route announcement packet RAE and transmits the packets to the communication unit 30.

The routing table 33 stores the route information indicating the routes to the respective destinations and has the same structure as the routing table 20 described above.

Figure 20:
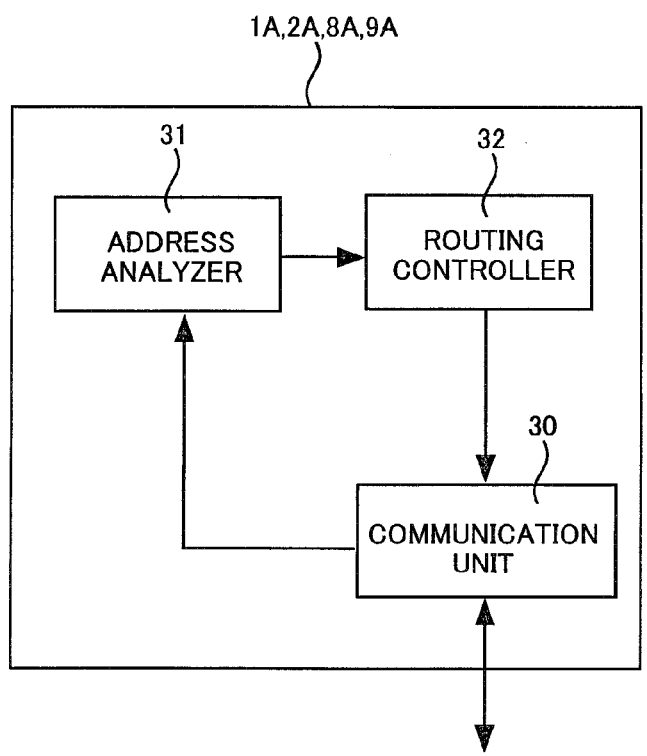
FIG. 20 is another schematic block diagram illustrating the structure of some radio devices of the radio devices shown in FIG. 14.

In the above, it is explained that the radio devices 1A, 2A, 8A, and 9A have the structure shown in FIG. 15. With the present invention, however, that is not always the case, and the structure of the radio devices 1A, 2A, 8A, and 9A may be as shown in FIG. 20. FIG. 20 is another schematic block diagram illustrating the structure of the radio devices 1A, 2A, 8A, and 9A shown in FIG. 14.

With reference to FIG. 20, each of the radio devices 1A, 2A, 8A, and 9A is identical with the radio devices 0 to 9 shown in FIG. 19 except that the routing table 33 of the radio devices 0 to 9 is removed.

In the above, it is explained that the topology information TPIF is produced based on the MAC address in Layer 2 to establish the route for wireless communication between source and destination. With the present invention, however, that is not always the case, and the topology information TPIF may be produced based on the IP address to establish the route for wireless communication between source and destination.

Further, in the above, it is explained that the radio devices 1A and 3, which are the sources, produce the route request packet RREQ and transmit the packet to the radio device 0. With the present invention, however, that is not always the case, and the radio devices 1A and 3, which are the sources, may produces a packet PKT including a message requesting the notification of the route to the radio devices 5 and 8A, which are the destinations, and transmit the packet to the radio device 0.

Further, in the above, it is explained that either the radio device 3 that is the source or the radio device 4 that is adjacent to the radio device 1A, which is the source, transmits the route notification packet RNTF notifying of the route for wireless communication between source and destination. With the present invention, however, that is not always the case, and either the radio device 3 that is the source or the radio device 4 that is adjacent to the radio device 1A, which is the source, may transmit a packet PKT including the route for wireless communication between source and destination as a message.

Further, in the above, it is explained that the radio devices 5 and 8A that are the destinations produce the route reply packet RREP and transmit the packet to the radio devices 3 and 1A that are the sources. With the present invention, however, that is not always the case, and the radio devices 5 and 8A that are the destinations may produce a packet PKT including a message acknowledging the route setup and transmit the packet to the radio devices 3 and 1A that are the sources.

The embodiments as have been described here are mere examples and should not be interpreted as restrictive. The scope of the present invention is determined by each of the claims, not by the written description of the embodiments, and embraces modifications within the meaning of, and equivalent to, the languages in the claims.

Industrial Applicability

The present invention is applied to the wireless network system that enables load reduction.

The invention claimed is:

1. A wireless network system carrying out multi-hop wireless communication between a source and a destination, comprising:
a first radio device maintaining topology information (TPIF) indicating the arrangement of all radio devices constituting the wireless network system wherein said topology information includes the arrangement in which each of the radio devices is an origin device, when a route for wireless communication is established between the source and the destination, said first radio device transmitting route information indicating the route based on the topology information (TPIF); and a plurality of second radio devices establishing the route based on the route information transmitted by the first radio device, wherein the first radio device and each of the plurality of second radio devices is configured to periodically gather information on its respective adjacent radio devices and then to produce link state information based on the gathered information, wherein the first radio device is configured to periodically receive the link state information transmitted from the plurality of second radio devices and based on the received link state information, and only the first radio device is configured to produce and maintain the TPIF, wherein each of the first radio device and the plurality of second radio devices is suitable to wireless communication based on the link state information related to the respective adjacent radio devices, wherein, upon carrying out wireless communication with the destination, the source radio device that is one of the plurality of second radio devices receives, from the first radio device, route information indicating the route from the radio device itself to the destination radio device and establishes the route to the destination radio device based on the received route information, wherein the source radio device transmits to the first radio device a route request packet (RREQ), receives from the first radio device a route setup packet (RSET) including the route information, transmits a route notification packet (RNTF) notifying each radio device on the route that wireless communication is carried out along the route indicated by the route information included in the received route setup packet (RSET), and receives from the destination radio device a route reply packet (RREP) accepting the establishment of the route indicated by the route information;

in response to the route request packet (RREQ), the first radio device extracts route information indicating the optimal route from the source radio device to the destination radio device by looking-up the topology information (TPIF), produces the route setup packet (RSET) including the extracted route information and transmits the produced route setup packet (RSET) to the source radio device;

upon receiving the route notification packet (RNTF), the radio device adjacent, on the route, to the destination radio device transmits a route request packet (RREQ) to the destination radio device; and in response to the route request packet (RREQ), the destination radio device produces the route reply packet (RREP) and transmits the produced route reply packet (RREP) to the source radio device.

2. A wireless network system carrying out multi-hop wireless communication between a source and a destination, comprising:

a first radio device maintaining topology information (TPIF) indicating the arrangement of all radio devices constituting the wireless network system wherein said topology information includes the arrangement in which each of the radio devices is an origin device, when a route for wireless communication is established between the source and the destination, said first radio device transmitting route information indicating the route based on the topology information (TPIF); and a plurality of second radio devices establishing the route based on the route information transmitted by the first radio device, wherein the first radio device and each of the plurality of second radio devices is configured to periodically gather information on its respective adjacent radio devices and then to produce link state information based on the gathered information, wherein the first radio device is configured to periodically receive the link state information transmitted from the plurality of second radio devices and based on the received link state information, and only the first radio device is configured to produce and maintain the TPIF, wherein the first radio device is suitable to wireless communication based on the link state information related to the radio devices adjacent to the first radio device itself;

the plurality of second radio devices comprises i (i is a positive integer) third radio devices each suitable to wireless communication based on the link state information, and j (j is a positive integer) fourth radio devices each unsuitable to wireless communication based on the link state information, wherein a radio device adjacent to one of the j fourth radio devices is one of the i third radio devices, and when the source radio device that is one of the j fourth radio devices carries out wireless communication with the destination, a first adjacent radio device that is adjacent to the source radio device and is one of the i third radio devices receives, from the first radio device, route information indicating the route from the source radio device to the destination radio device and established the route to the destination radio device based on the received route information.

3. The wireless network system according to claim 2, wherein the source radio device transmits a route request packet (RREQ) to the first radio device;

the first adjacent radio device receives from the first radio device a route setup packet (RSET) including the route information, transmits a route notification packet (RNTF) notifying each radio device on the route that wireless communication is carried out along the route indicated by the route information included in the received route setup packet (RSET), receives from the destination radio device a route reply packet (RREP) accepting the establishment of the route indicated by the route information, and relays the received route reply packet (RREP) to the source radio device;

in response to the route request packet (RREQ), the first radio device extracts route information indicating the optimal route from the source radio device to the destination radio device by looking-up the topology information (TPIF), produces the route setup packet (RSET) including the extracted route information and transmits the produced route setup packet (RSET) to the first adjacent radio device;

upon receiving the route notification packet (RNTF), the destination radio device produces the route reply packet (RREP) and transmits the produced route reply packet (RREP) to the source radio device.

4. The wireless network system according to claim 3, wherein, when the destination radio device is one of the j fourth radio devices, upon receiving the route notification packet (RNTF), a second adjacent radio device that is adjacent, on the route, to the destination radio device and is one of the i third radio devices transmits a route request packet (RREQ) to the destination radio device.

* * * * *